(12) United States Patent
Szaroletta et al.

(10) Patent No.: US 6,985,214 B2
(45) Date of Patent: Jan. 10, 2006

(54) METHOD AND APPARATUS FOR ENHANCING VISUALIZATION OF MECHANICAL STRESS

(75) Inventors: William K. Szaroletta, West Lafayette, IN (US); John C. Anderson, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 383 days.

(21) Appl. No.: 10/267,369

(22) Filed: Oct. 9, 2002

(65) Prior Publication Data

US 2003/0067593 A1 Apr. 10, 2003

Related U.S. Application Data

(60) Provisional application No. 60/328,009, filed on Oct. 9, 2001.

(51) Int. Cl.
*G01B 11/16* (2006.01)

(52) U.S. Cl. .......................................... 356/34; 356/35

(58) Field of Classification Search ................... 356/32, 356/35; 73/795, 800
See application file for complete search history.

(56) References Cited

U.S. PATENT DOCUMENTS

| | | | | |
|---|---|---|---|---|
| 3,994,598 A | * | 11/1976 | Reytblatt | 356/34 |
| 4,008,960 A | * | 2/1977 | Reytblatt | 356/33 |
| 4,324,547 A | * | 4/1982 | Arcan et al. | 433/71 |
| 5,400,131 A | * | 3/1995 | Stockley et al. | 356/33 |
| 6,055,053 A | * | 4/2000 | Lesniak | 356/366 |
| 6,072,568 A | * | 6/2000 | Paton et al. | 356/32 |
| 6,327,030 B1 | * | 12/2001 | Ifju et al. | 356/32 |
| 6,650,405 B2 | * | 11/2003 | Lam et al. | 356/33 |

* cited by examiner

*Primary Examiner*—Layla G. Lauchman
(74) *Attorney, Agent, or Firm*—Barnes & Thornburg LLP

(57) ABSTRACT

Photoelastic elements are formed deliberately with stress concentrations so that, when evaluated with a polariscope, more pronounced isochromatic bands or fringes result when loads are applied to these elements or to assemblies of these elements. A kit of photoelastic elements, at least some of which have stress concentrations formed therein, is also disclosed. In addition, a toy for producing color patterns is disclosed.

30 Claims, 18 Drawing Sheets

(9 of 18 Drawing Sheet(s) Filed in Color)

METHOD AND APPARATUS FOR ENHANCING VISUALIZATION OF MECHANICAL STRESS

This application claims the benefit, under 35 U.S.C. § 119(e), of U.S. Provisional Patent Application Ser. No. 60/328,009 which was filed Oct. 9, 2001 and which is hereby expressly incorporated by reference herein.

BACKGROUND

The present disclosure relates to the novel utilization of the well-established photoelasticity principles to the design, analysis, fabrication, and testing of mechanical elements, such as elements used to construct trusses. More particularly, the present disclosure relates to a method and apparatus for enhancing visualization of mechanical stress in structural elements.

The science of photoelasticity has a long history, dating back to Brewster's investigations in 1816. Neumann further developed the science to include formulas for strain in terms relevant to photoelasticity. Maxwell extended Neumann's formulas in terms of stress.

A number of tools are available for evaluating strength of materials, as well as mechanical stress and strain occurring in objects under load before a mechanical element is fabricated. Such tools include mold analysis software, finite element analysis (FEA) software, and traditional analytical techniques taught in most Strength of Materials courses. Mold analysis software models the temperature variations or pressure drop variations, due to viscosity of polymer flow front, that is likely to occur in parts during a molding process. FEA software uses a mathematical model of a structure and the computational power of the computer to determine theoretical stress and strain values that occur through the structure under applied loads. Various input parameters, such as the magnitude and direction of the applied load and the material from which the structure is made, are selected to perform FEA. Traditional analysis utilizes appropriate mechanical element material properties, geometry, loading, and constraints to produce estimates on stress and strain levels.

Polariscopes typically have one or more light sources that shine light through a pair of spaced, polarized filters between which is placed the photoelastic object to be evaluated. The polarizing filter closest to the light source is typically called the polarizer and produces emergent light that is plane polarized. The polarizing filter farthest from the light source is typically called the analyzer. As light passes through the polarizer and a loaded specimen, the light wave is split into two orthogonal components. One of the light wave components coincides with the maximum stress plane, while the other component coincides with the minimum stress plane. Since the two light wave components travel at different speeds, they experience a relative retardation. The analyzer allows these two light wave components to pass through parallel to the analyzer's polarizing axis, thereby giving an optical method to deduce the difference between the two principal stresses. When a white light source is utilized in the polarizer, colored bands of light, called isochromatics, appear in fringe patterns. Applying a load to the photoelastic object situated between the filters produces visible isochromatic fringe patterns from which the stress and strain within the object can be deduced. Each isochromatic band is associated with a particular stress level.

There exist two major types of polariscopes in general usage, including a transmission Polariscope and a reflection Polariscope. Transmission polariscopes are used to visually evaluate stresses in thin three-dimensional objects made of photoelastic or birefringment materials, which are transparent or semi-transparent materials such as polycarbonate or acrylic (PMMA). Non-transparent objects can also be evaluated using photoelastic principles through the addition of coatings consisting of a reflective base coat and a top coating of photoelastic material allowing reflection photoelasticity. Maxwell's stress-optic law enables the stress components at a particular location to be analyzed.

Conventional polariscopes and photoelastic materials are sometimes used in academic settings and in industry to gain an understanding of stress and strain formation in individual structural elements or assemblies of structural elements. Trusses and other multi-link structural assemblies typically include elements having continuous or solid cross-sections. However, when using a polariscope to evaluate these elements, it is extremely difficult to discern visually the stress states occurring in the photoelastic elements having such cross-sections because, when loads are applied to these elements, the color changes between adjacent isochromatic bands are fairly subtle.

Characteristics inherent in molding processes have an effect on stress formation in parts made by the molding process. Such characteristics include, for example, temperature variations in a mold cavity during the molding process, pressure drops due to viscosity variations of polymer flow front in the mold cavity, and knit lines formed when slightly cooled plastic flows together from multiple directions in a mold cavity. The location of the gates through which material is injected into a mold cavity affects these various molding characteristics as well. After a molded part cools, there are residual stresses in the molded part due to these various molding characteristics.

SUMMARY

According to this disclosure, photoelastic elements are formed deliberately with stress concentrations so that, when evaluated with a polariscope, more pronounced isochromatic bands or fringes result when loads are applied to these elements or to assemblies of these elements. The stress concentrations may include, for example, one or more holes of any shape formed in a photoelastic element, one or more notches or grooves of any shape formed in a photoelastic element, one or more injection molding knit lines formed in a photoelastic element during a molding process, and one or more holes of any shape formed in a reflective photoelastic material coating applied to an element. Stresses viewable on the polariscope may be compared with the results predicted by FEA software or with the results predicted by mold flow software.

Mechanical elements having a novel means of visually amplifying the range of isochromatic fringe patterns near the center of the mechanical element so that the subtleties of the process can be reduced are disclosed herein. These mechanical elements have one or more deliberately added stress-concentration features which act to provide visual amplification or enhancement of the stress, strain, and/or loading state. The present disclosure also describes a method for engineers, material scientists, and/or students to be able to investigate and understand the stresses inherent in typical molding processes by deliberately designing the mold cavity injector locations to produce weld or knit lines near the center of a mechanical element.

As contemplated in this disclosure, photoelastic elements having similar geometries but having knit lines in different locations, due to variations in gate location, can be evaluated and compared with the polariscope to determine desired gate locations. As also contemplated by this disclosure, a truss assembly made of photoelastic elements having stress concentrations formed therein may be evaluated with a polariscope to determine which of the elements of the truss assembly are the primary load-bearing elements and which are not. By having stress concentrations in the truss elements, it is easier to discern with the polariscope which elements are the primary load-bearing elements. Based on this type of evaluation, a decision can be made as to whether the truss assembly should be redesigned into a configuration in which loads are shared more equally among the truss elements or whether certain elements that are minimally loaded should be removed from the truss assembly. Once the design of the truss assembly made with elements having stress concentrations is made suitable for a particular load condition, then truss assemblies constructed from elements that do not have stress concentrations may be configured similarly.

Also according to this disclosure, photoelastic elements having stress concentrations deliberately formed therein are included in a kit. Photoelastic elements of similar geometry, but without stress concentrations may also be included in the kit for comparison purposes. The elements may be coupled together with fasteners included in the kit to form a variety of truss assemblies. Loads are applied to the elements or truss assemblies and stress formation is observed with a polariscope. In an illustrative embodiment, the photoelastic elements comprise links that are 3 inches, 4 inches, and 5 inches in length. The stresses formed in the elements having stress concentrations formed therein are higher in the regions near the stress concentrations and therefore, can be seen more easily with the polariscope. The stress concentrations may include, for example, one or more holes of any shape formed in a link, one or more notches or grooves of any shape formed in a link, and one or more injection molding knit lines formed in a link during a molding process.

Further according to this disclosure, a toy for producing color patterns is provided. The toy comprises a pair of spaced frames, a pair of polarizing filters, and a handle. Each polarizing filter is coupled to a respective one of the frames. The handle has a first portion fixed to at least one of the frames, a flexible portion extending from the first portion between the polarizing filters, and a second portion extending from the flexible portion. The handle is configured so that squeezing the second portion toward the first portion flexes the flexible portion to induce stress therein. A stress concentration is formed in the flexible portion so that when the stress is induced in the flexible portion, a more pronounced set of isochromatic bands or fringes of various colors is observable by looking through the pair of filters.

Additional features will become apparent to those skilled in the art upon consideration of the following detailed description of illustrative embodiments exemplifying the best mode of carrying out the method and apparatus for enhancing visualization of mechanical stress as presently perceived.

BRIEF DESCRIPTION OF THE DRAWINGS

The patent or application file contains at least one drawing executed in color. Copies of this patent or patent application with color drawing(s) will be provided by the Office upon request and payment of the necessary fee.

The detailed description particularly refers to the accompanying figures, in which.

DETAILED DESCRIPTION OF THE DRAWINGS

Figure 1:
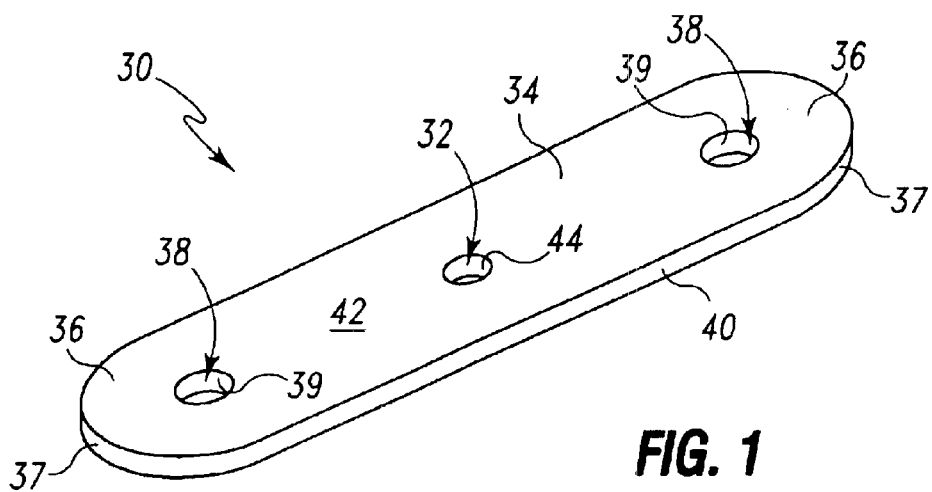
FIG. 1 is perspective view of a link that is made from a photoelastic material and that has a stress concentration formed in a middle region thereof.

According to this disclosure, simple truss elements are designed, analyzed, fabricated, and tested in such a manner that mechanical stresses are able to be visualized in the truss elements when tested individually and in various types of assembled truss structures using the truss elements. A number of shapes and sizes of truss elements are disclosed herein. In addition, truss elements are provided in a kit and may be assembled into a variety of truss assemblies. Examples of individual truss elements are shown in FIGS. 1, 11, 14–17, and 20. Examples of truss assemblies are shown in FIGS. 5, 7, 9, and 10. The truss elements are made from a photoelastic or birefringement material, such as polycarbonate or acrylic (PMMA).

The truss elements and truss assemblies are placed under a variety of load conditions and the stresses resulting in the truss elements and assemblies are viewed with a polariscope. Polariscope images are shown in FIGS. 3, 6, 8, 21, and 22. In order to more easily discern which elements in a truss assembly are the primary load-bearing elements and which are not, truss elements according to this disclosure are formed to include stress concentrations. By forming stress concentrations in the truss elements, isochromatic bands or fringes are more pronounced visually when the truss elements and assemblies are placed under load and are viewed with a polariscope.

Various types of software, such as IronCAD™, COSMOS DesignSTAR™, 3D LightYEAR™, and MoldFLOW ADVISOR™, may be used to analyze the designs of the various truss elements and truss assemblies. These software packages may be used to create a multitude of color images of the truss elements and assemblies with various colors indicating selected parameters such as stress, strain, pressure drop, mold cavity temperature, etc. Color images generated by some of these software packages are shown, for example, in FIGS. 2, 12, 13, 18, and 19. Stress patterns viewed on the polariscope may be compared with the stress patterns predicted by FEA software, or the color patterns generated by other types of software, in order to determine whether the software produces a true representation of stress states occurring in actual parts or whether other parameter variations effect stress formation in actual parts. Most software is programmed based on linear mathematical models, whereas nonlinear stress states are typical in actual parts.

Molding characteristics, such as gate location in injection molding processes, may affect the manner in which stresses occur in truss elements when placed under loads. Temperature variations, pressure variations, and, in some instances, knit lines, that are inherent in the injection molding process, result in residual stresses being present in unloaded elements. These residual stresses are viewed with a polariscope and are compared with software models of the parts according to this disclosure. The various photoelastic truss elements disclosed herein may be fabricated by injection molding, stereolithography prototyping, casting, or other processes suitable for creating photoelastic elements of a desired shape. As contemplated by this disclosure, comparisons between the stresses occurring in photoelastic elements made by different fabrication processes, but having similar geometries and placed under similar load conditions, may be made with a polariscope.

The methods and apparatus disclosed herein for enhancing visualization of mechanical stress are particularly useful in an academic environment to develop students' comprehension of mechanics-statics principles and to develop students' understanding of the relationship between design and manufacturing processes on the ultimate performance of a part or assembly of parts. However, the disclosed methods and apparatus may be used in industry, as well, to analyze and evaluate a proposed design or manufacturing process. Thus, the disclosed methods and apparatus for enhancing stress visualization during the process of designing, analyzing, fabricating, and testing parts and assemblies are applicable not just to the illustrative truss elements and toys, but are applicable to parts and assemblies having all shapes and sizes.

Referring to FIG. 1, a truss element or link 30 in accordance with this disclosure is formed to include a stress concentration 32 in a central region 34 of the link 30. Link 30 is made of a photoelastic material or birefringement material so that stresses produced in link 30 may be viewed with a polariscope. Illustrative link 30 has a pair of opposite end regions 36 having rounded end edges 37 and that are formed to include apertures 38. Central region 34 of illustrative link 30 has a pair of straight side edges 40 extending between end regions 36. In addition, link 30 has a pair of spaced-apart, planar faces 42 that are perpendicular to side edges 40. Thus, link 30 is a fairly simple truss element, but includes stress concentration 32, which, illustratively, is a round hole defined by a cylindrical edge 44 that extends between faces 42. Illustrative apertures 38 are each defined by a cylindrical edge 39 that extends between faces 42.

Stress concentration 32 is sometimes referred to herein as hole 32. Hole 32 is located midway between apertures 38 and midway between side edges 40. Round apertures 38 have centers which coincide with respective centers of circles that are defined, in part, by respective rounded end edges 37. An axis (not shown) defined by cylindrical edge 44 is parallel with axes (not shown) defined by cylindrical edges 39. In addition, the axes defined by cylindrical edges 38, 44 are perpendicular to faces 42. Furthermore, the axes defined by cylindrical edges 38, 44 lie in a common plane. In alternative embodiments, stress concentrations or holes are formed through links 20, 30, 50 at angles that are not perpendicular to faces 42.

Figure 2:
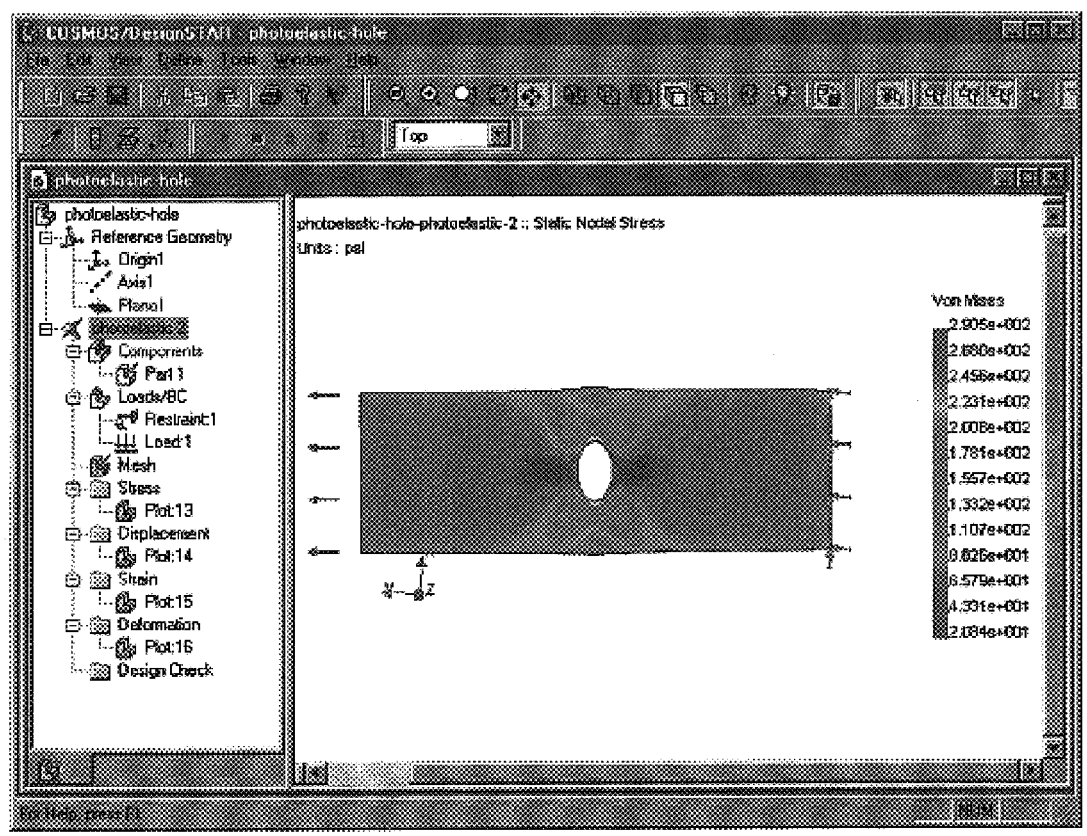
FIG. 2 is a color image of an FEA software analysis showing a computer-modeled link under compression and showing hypothetical stresses created in a region adjacent a stress concentration formed in the computer-modeled link.

Central region 34 of link 30, including stress concentration 32, may be modeled using COSMOS DesignSTAR™ FEA software and may be placed, theoretically, under compression loading in order to produce a color representation of predicted static nodal stresses as shown in FIG. 2. The color representation in FIG. 2 shows a pair of dark blue isochromatic fringes extending generally horizontally away from opposite sides of the hole of the computer-modeled link and also shows a generally X-shaped, four-lobed pattern of green isochromatic fringes with the center of the X-shaped pattern coinciding with the center of the hole. In addition, small yellow isochromatic fringes are shown embedded in the green isochromatic fringes adjacent the top and bottom of the hole. The hole of the computer-modeled link in FIG. 2 is shown to be distorted into an oval having its major axis extending vertically. A legend to the right of the computer-modeled link in FIG. 2 shows the relative values of static nodal Von Mises stress, in pounds per square inch (psi), corresponding to the various colors appearing in the computer-modeled link.

Figure 3:
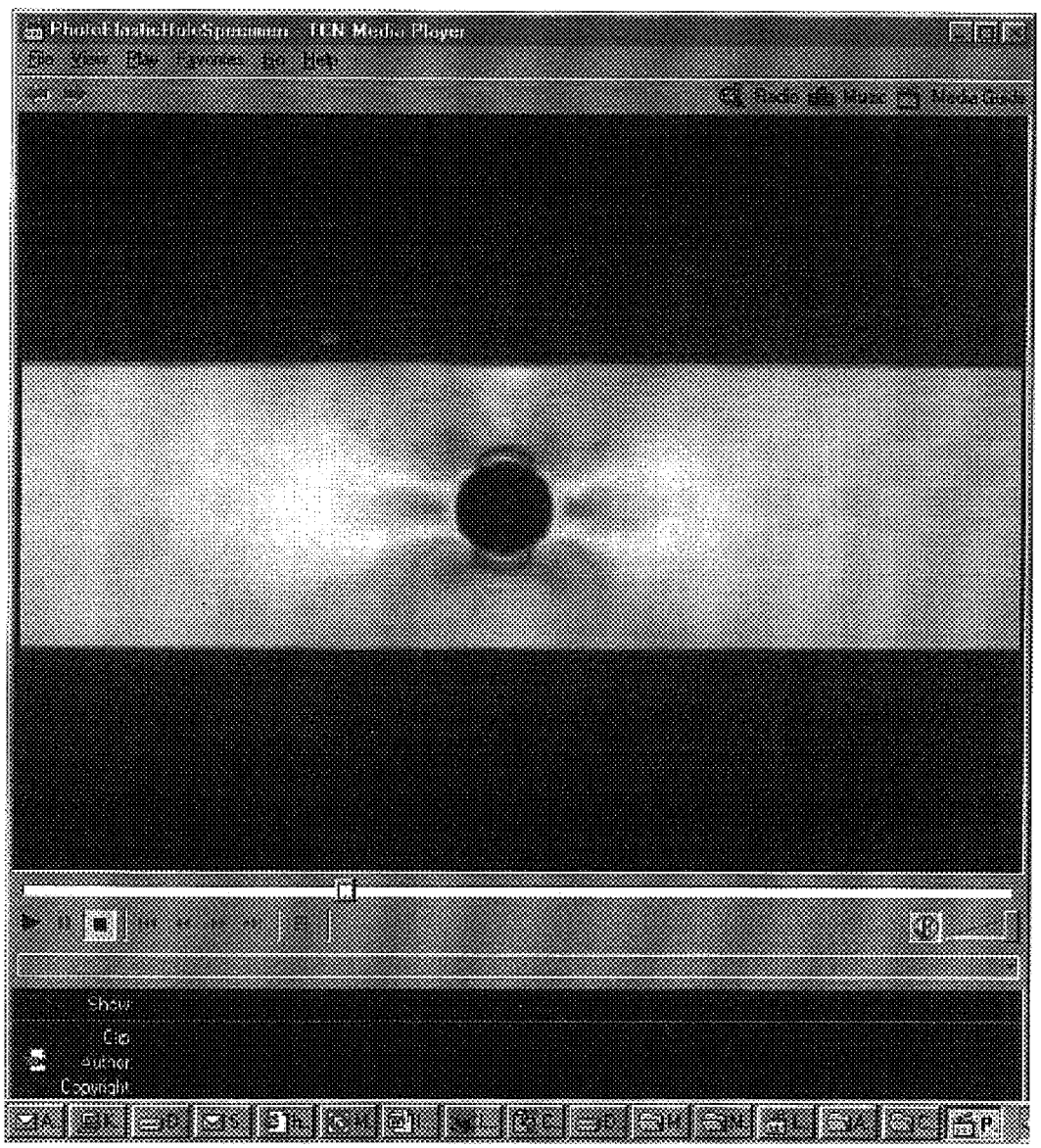
FIG. 3 is a color image of the link of FIG. 1 showing actual stresses created around the stress concentration of the link when the link is placed under compression and viewed with a polariscope.

When link 30 is placed under compression loading and is viewed with a polariscope, as shown in FIG. 3, a similar overall pattern of stresses result in link 30 as were modeled in FIG. 2. However, as is readily apparent by comparing FIG. 3 to FIG. 2, there are more color variations in each of the fringe regions or lobes in the actual link 30 than are predicted using the FEA software. In addition, hole 32 in link 30 does not distort as much as predicted by the FEA software. It is readily apparent in FIGS. 2 and 3, that areas sufficiently spaced from the right and from the left of the hole in the link have substantially minimal color changes, and therefore, the corresponding stress level variations in these areas are substantially minimal. Thus, without stress concentration 32 being formed in link 30, stresses occurring in link 30 under compression loading would be difficult, if not impossible, to discern visually with a polariscope.

Figure 4:
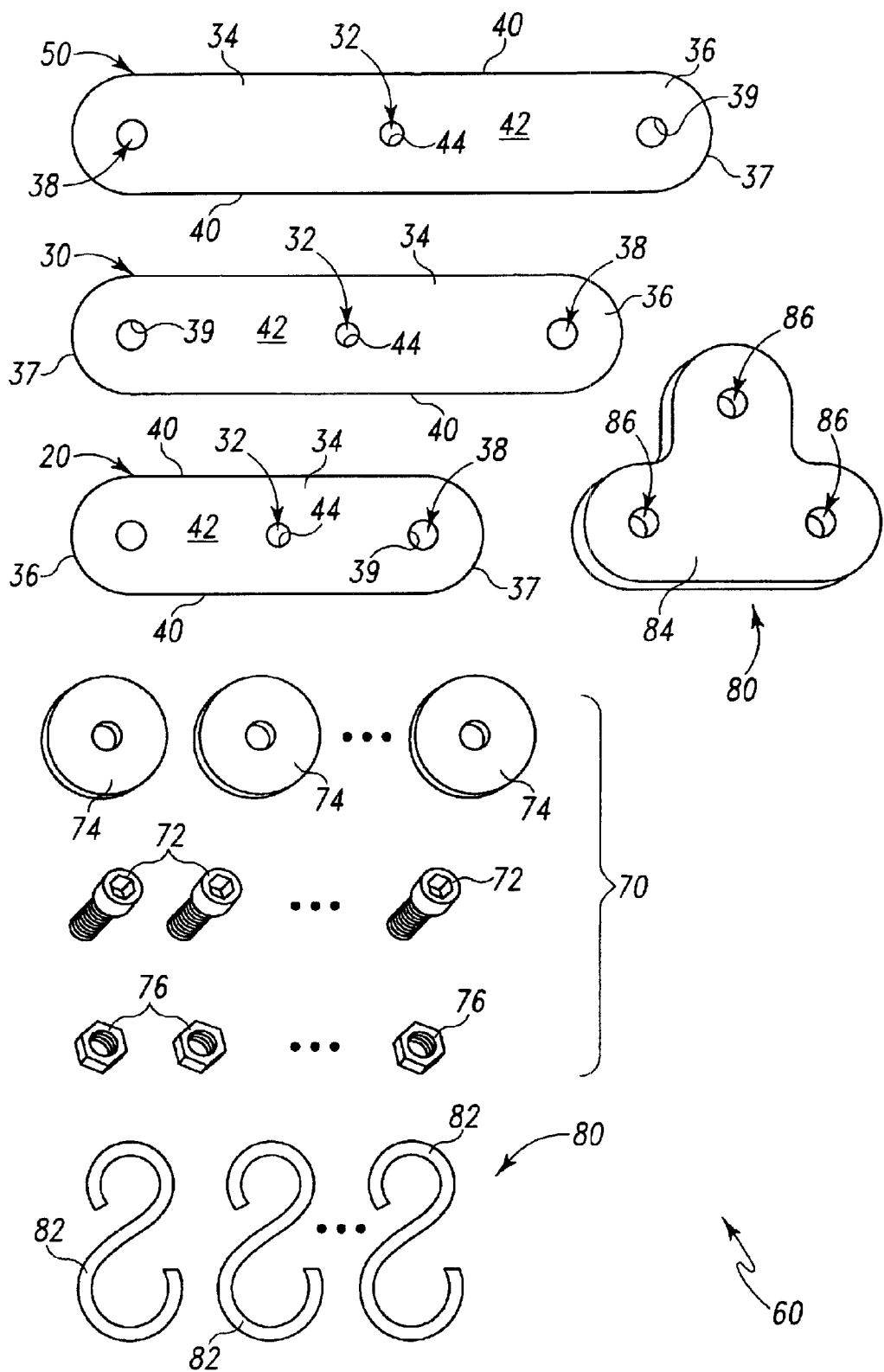
FIG. 4 is a front view of a portion of a truss-formation kit having a plurality of photoelastic links that vary in length, a plurality of link couplers, and a plurality of load couplers.

Referring now to FIG. 4, a kit 60 includes a plurality of links 30, a plurality of links 20 which are shorter than links 30, and a plurality of links 50 which are longer than links 30. Only one each of links 20, 30, 50 are shown in FIG. 4. Other than the difference in lengths, links 20, 50 are similar in many respects to links 30. Thus, like reference numbers are used to denote portions of links 20, 50 that correspond to like portions of links 30. For example, each of links 20, 50 has central region 34 formed with a stress concentration 32, a pair of end regions 36 formed with apertures 38, and straight edges 40 interconnecting end regions 36. In addition, each of links 20, 50 is made from a photoelastic material, as are links 30.

The width of each link 20, 30, 50, which is defined as the perpendicular distance between respective edges 40, is substantially the same as the width of each of the other links 20, 30, 50 in kit 60. The thickness of each link 20, 30, 50, which is defined as the perpendicular distance between respective faces 42, is substantially the same as the thickness of each of the other links 20, 30, 50 in kit 60. Furthermore, the size of stress concentration 32 of each link 20, 30, 50 is substantially the same as the size of stress concentration 32 of each of the other links 20, 30, 50. In addition, hole 32 of each link 20, 30, 50 is situated midway between the associated apertures 38 and midway between the associated side edges 40. Thus, the distance between hole 32 and either aperture 38 of each link 20 is smaller than the distance between hole 32 and either aperture 38 of each link 30 because links 20 are shorter than links 30. Likewise, the distance between hole 32 and either aperture 38 of each link 30 is smaller than the distance between hole 32 and either aperture 38 of each link 50 because link 30 is shorter than link 50. In the illustrative embodiment, holes 32 are smaller than apertures 38. In some alternative embodiments, holes 32 are larger than apertures 38 and, in other alternative embodiments, holes 32 are substantially the same size as apertures 38. Apertures 38 of each link 20, 30, 50 are substantially the same size.

In some kit embodiments contemplated by this disclosure, links 20, 30, 50 are configured having their lengths, which are defined as the distance between centers of respective apertures 38, such that links 20 are 3 units in length, links 30 are 4 units in length, and links 50 are 5 units in length. In the illustrative kit 60, for example, links 20 are 3 inches in length, links 30 are 4 inches in length, and links 50 are 5 inches in length. Thus, links 20, 30, 50 may be assembled into 3-4-5 right triangular link assemblies if desired. It will be appreciated that the length units of links 20, 30, 50 may be of any standard length measurement, such as inches, centimeters, or feet, as well as any arbitrary length unit, and that 3-4-5 right triangles may be constructed so long as the relative 3-4-5 ratios between links 20, 30, 50 is maintained. Kits having links of any desired length(s) are within the scope of this disclosure.

Kit 60 includes a plurality of link couplers 70 and a plurality of load couplers 80 as shown in FIG. 4. Illustrative link couplers 70 include bolts 72, washers 74, and nuts 76. Apertures 28 are sized to receive the threaded portions of bolts 72 therein. Nuts 76 and the head portions of bolts 72 are larger than apertures 38. In addition, the central hole in washers 74 is sized to receive the threaded portions of bolts 72 therein. Thus, to couple links 20, 30, 50 together, end regions 36 of two or more links 20, 30, 50, selected by a user, are arranged in overlapping relation so that respective apertures 38 in end regions 36 of the selected links 20, 30, 50 are aligned and bolts 72 are inserted through the aligned apertures 38. Nuts 76 are then threaded onto threaded portions of bolts 72 such that the end regions 36 of the selected links 20, 30, 50 are situated between nuts 76 and the head portions of respective bolts 72. Optionally, bolts 72 extend through washers 74 which may be placed between end regions 36 of the selected links 20, 30, 50 and/or between nuts 76 and whichever of selected links 20, 30, 50 is closest to respective nuts 76 and/or between the head portions of bolts 72 and whichever of selected links 20, 30, 50 is closest to the head portions of respective bolts 72. In alternative embodiments, other types of link couplers, such as rivets, pins, snaps, hooks, posts, tabs, flanges, clamps, and the like may be used to couple links 20, 30, 50 together, as desired, in lieu of bolts 72, washers 74, and nuts 76. Links having link couplers formed integrally therewith are also contemplated by this disclosure.

Illustratively, load couplers 80 include hooks 82 and plates 84 as shown in FIG. 4. Hooks 82 are generally S-shaped and are configured so that lower hook portions or upper hook portions are able to hook onto any of the bolts 72 that are coupled to one or more of links 20, 30, 50. Plates 84 are generally T-shaped and have three rounded lobes, each lobe having an aperture 86 formed therein. Apertures 86 are sized to receive the threaded portions of bolts 72 to permit coupling of plates 84 to any of the bolts 72 that are coupled to one or more of links 20, 30, 50. Thus, hooks 82 and plates 84 may be coupled to links 20, 30, 50 or truss assemblies constructed from links 20, 30, 50 at any desired location where bolts 72 are coupled to one or more of links 20, 30, 50. Forces are transmitted to links 20, 30, 50 or assemblies of links 20, 30, 50 via load couplers 80 as will be described in further detail below. If the stress levels of load couplers 80 are to be evaluated, then load couplers 80 are made of photoelastic material. Otherwise, load couplers 80 are made from any suitable material capable of withstanding the loads to be applied thereto without deforming by an undue amount.

Figure 5:
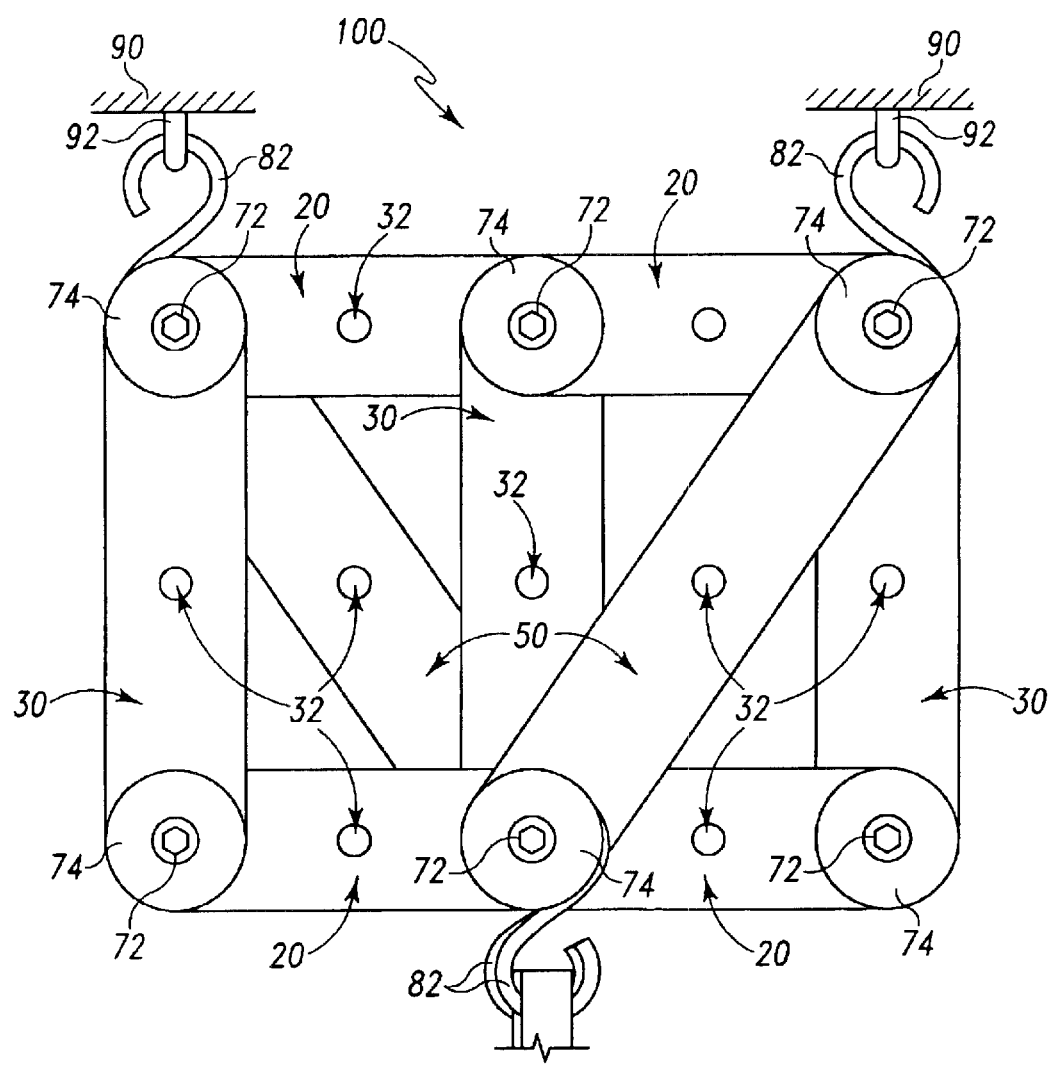
FIG. 5 is a front elevation view of a truss assembly formed from the components of the kit of FIG. 4.

Referring now to FIG. 5, an exemplary truss assembly 100 is formed by coupling together links 20, 30, 50 from kit 60. Assembly 100 has three links 30 arranged vertically, four links 20 arranged horizontally, and two links 50 arranged diagonally. The illustrative truss assembly of FIG. 5 has multiple 3-4-5 triangle arrangements provided by the interconnected links 20, 30, 50. Links 50 extend between respective upper corner connections of assembly 100 and a common lower middle connection of assembly 100. One of links 30 extends vertically between an upper middle connection of assembly 100 and the lower middle connection of assembly 100. The other two links 30 of assembly 100 extend vertically between respective upper corner connections and lower corner connections. Each link 20 of assembly 100 extends between a respective corner connection and a respective middle connection of assembly 100.

A pair of hooks 82 extends upwardly from the upper corner connections of assembly 100 and is coupled to a solid structure 90, such as a stationary frame of a polariscope, by respective eyelets 92 that extend downwardly from structure 90 and that receive the upper hook portions of respective hooks 82. Another pair of hooks 82 extends downwardly from the lower middle connection of assembly 100 in side-by-side relation. A downward pulling force is applied to assembly 100 via the lower pair of hooks 82. Such a force may be applied to assembly 100 by any force application technique such as, for example, hanging a weight on the lower hook portions of the lower pair of hooks 82.

Figure 6:
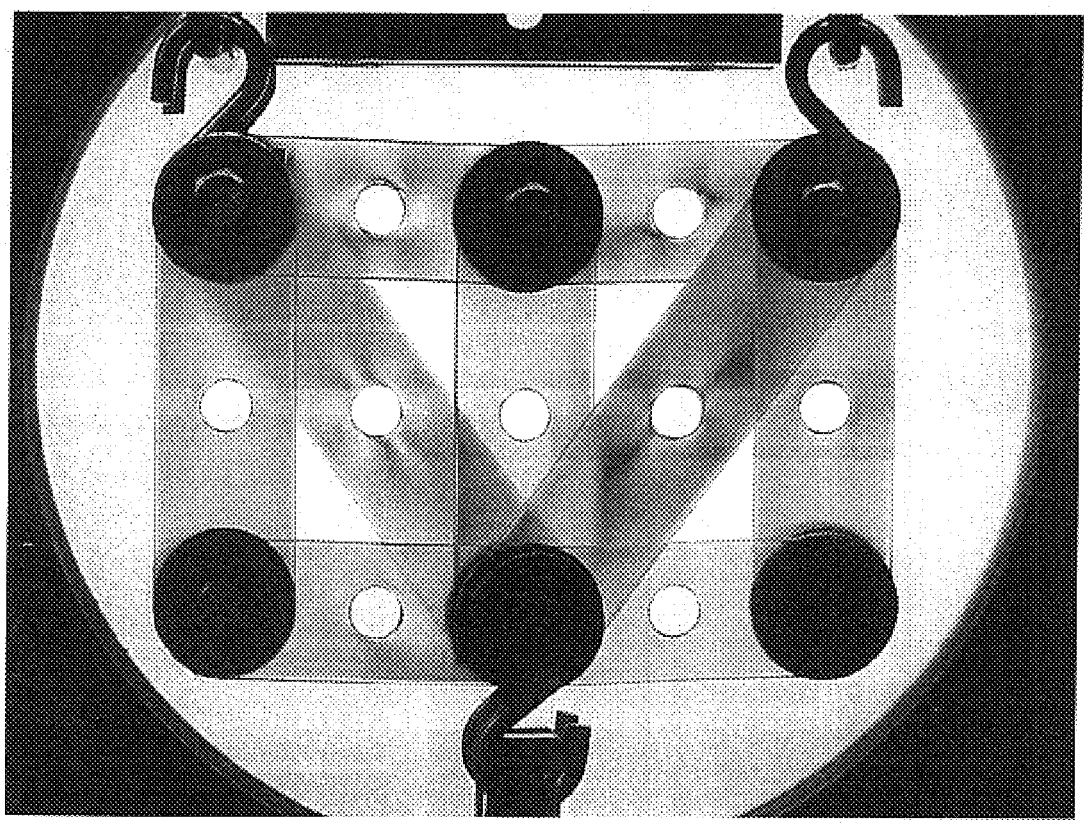
FIG. 6 is a color image of the truss assembly of FIG. 5 when placed under a controlled load condition and viewed with a polariscope to determine which of the links in the truss assembly are the primary load-bearing links.
Figure 8:
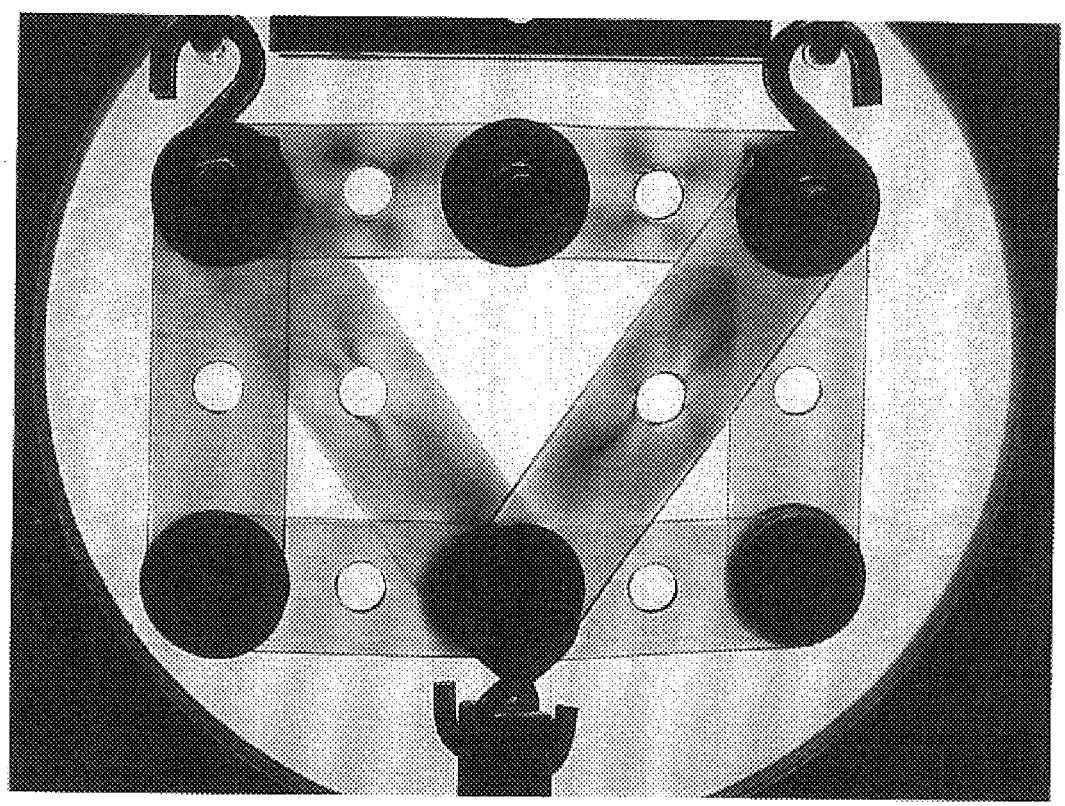
FIG. 8 is a color image of the redesigned truss assembly of FIG. 7 when place under the controlled load condition and viewed with the polariscope.

Referring now to FIG. 6 (reference numbers omitted from FIG. 6 for clarity), which is a color polariscope image of assembly 100 with a downward force being applied to the lower pair of hooks 82 of assembly 100, a prominent set of isochromatic bands or fringes are visible in links 50 adjacent the associated holes 32 and a less prominent set of isochromatic bands or fringes are visible in the upper pair of links 20 adjacent the associated holes 32. There are no discernable isochromatic bands or fringes in any of the three vertically extending links 30 or in either of the lower pair of links 20.

As mentioned previously, isochromatic bands are viewable with a polariscope as a result of stresses that exist in a photoelastic element under load. The more prominent the isochromatic fringes or bands are in a particular element, the more load is being carried by that particular element. Thus, when assembly 100 is loaded in the manner depicted in FIGS. 5 and 6, the primary load-bearing links of assembly 100 are the pair of diagonally extending links 50 and the upper pair of horizontally extending links 20, with links 50 clearly carrying more of the applied load than the upper pair of links 20. The other links of assembly 100 appear to carry either a negligible amount of the applied load or none at all. By having stress concentrations 32 formed in each of links 20, 30, 50, the determination as to which of links 20, 30, 50 in assembly 100 are the primary load-bearing links and which are not may be made more easily by visual inspection of assembly 100 with a polariscope.

Figure 7:
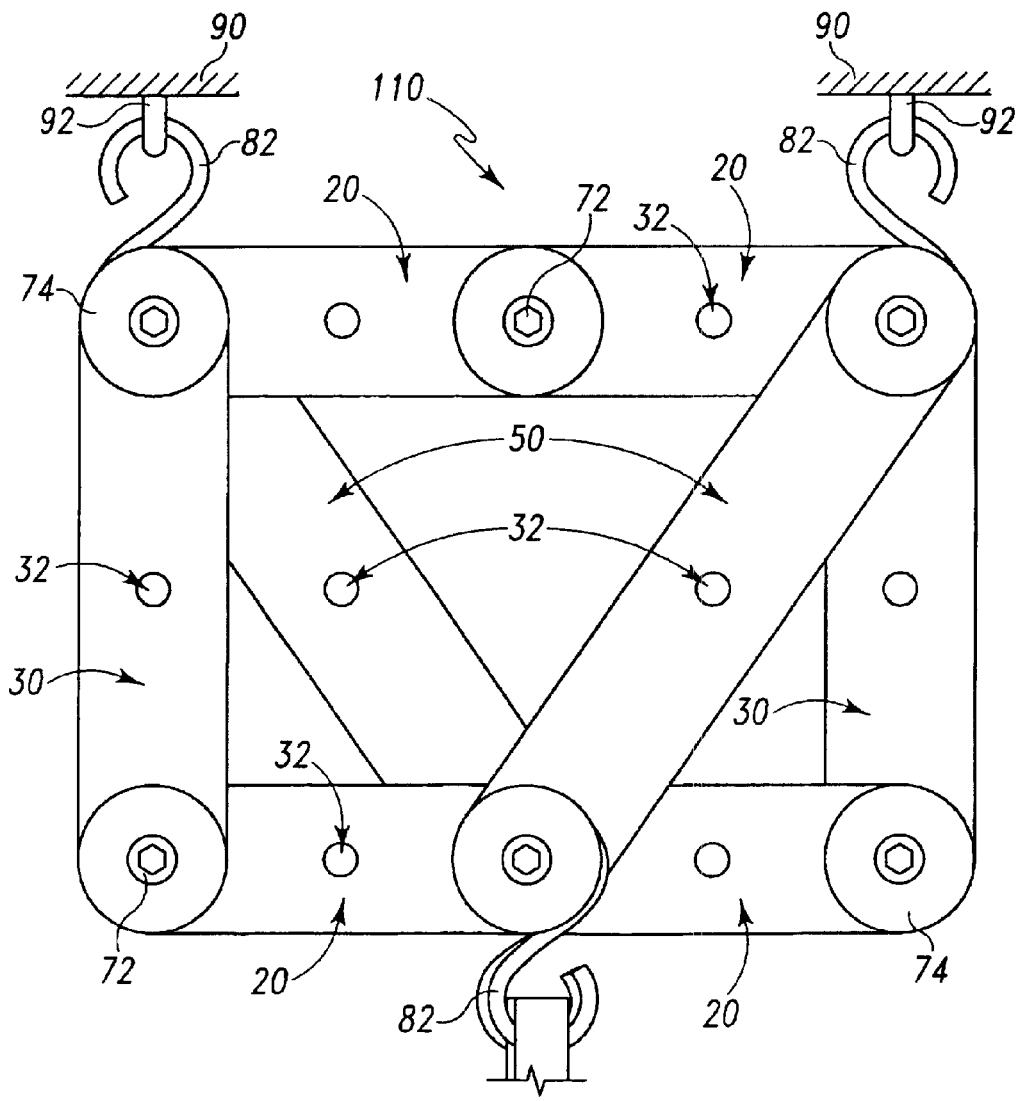
FIG. 7 is a front elevation view, similar to FIG. 5, showing a redesigned truss assembly, similar to the truss assembly of FIG. 5, but without a central vertical link.

Based on the visual inspection of assembly 100 with the polariscope, as shown in FIG. 5, one may conclude that it is advisable to redesign truss assembly 100 into a configuration in which loads are shared more equally among the links in the redesigned assembly under similar load conditions to those applied to assembly 100. Alternatively, one may conclude that certain links included in assembly 100 are not needed and may be removed, thereby reducing the cost and weight of the assembly. In the illustrative example, a redesigned truss assembly 110 is shown in FIG. 7. Assembly 110 is formed by removing the center vertical link 30 from assembly 100. As mentioned above, the center vertical link 30 of assembly 30 was not one of the primary load-bearing links.

By removing the center vertical link from assembly 100 to create assembly 110, cost and weight have been reduced without any noticeable sacrifice in the load carrying capability of assembly 110 as compared to assembly 100 under the illustrative load conditions. Based on a visual inspection of the color polariscope image of assembly 110 shown in FIG. 8 (reference numbers omitted from FIG. 8 for clarity), it can be seen that the isochromatic fringes or bands around the holes 32 of diagonally extending links 50 in assembly 110 are essentially the same in prominence and in color as the corresponding links 50 in assembly 100 when similar loads are applied to assemblies 100, 110. In the illustrative example, one might consider further redesigning assembly 110 by removing the lower pair of horizontally extending links 20 and the remaining pair of vertically extending links 30.

Designers of truss elements and other structures, generally seek to minimize stress levels and therefore, design parts so as to minimize stress concentrations. However, when truss assemblies are formed from a number of truss elements, it may be difficult to determine which are the primary load-bearing elements and which are not. As the illustrative examples of FIGS. 5–8 demonstrate, formation of stress concentrations, such as holes 32, in elements, such as links 20, 30, 50, enhances the ability to determine the primary load-bearing elements in an assembly, such as truss assembly 100 or truss assembly 110.

After a truss assembly has been designed or redesigned using elements with stress concentrations deliberately formed therein, then subsequent truss assemblies having the same overall shape, size, and design may be fabricated with parts that do not have the stress concentrations formed therein. In addition, elements to be evaluated with a polariscope are made with photoelastic materials, whereas elements made from such materials may not be desirable for certain applications. For example, if a truss assembly similar to assembly 110 is made from metal links and does not have holes 32 formed therein, one may still reasonably be assured that when vertical downward loads are applied to a lower central region of such a metal truss, that the metal links without holes 32, which correspond to the primary load-bearing links of assembly 110, are the primary load bearing links of the metal truss.

Figure 9:
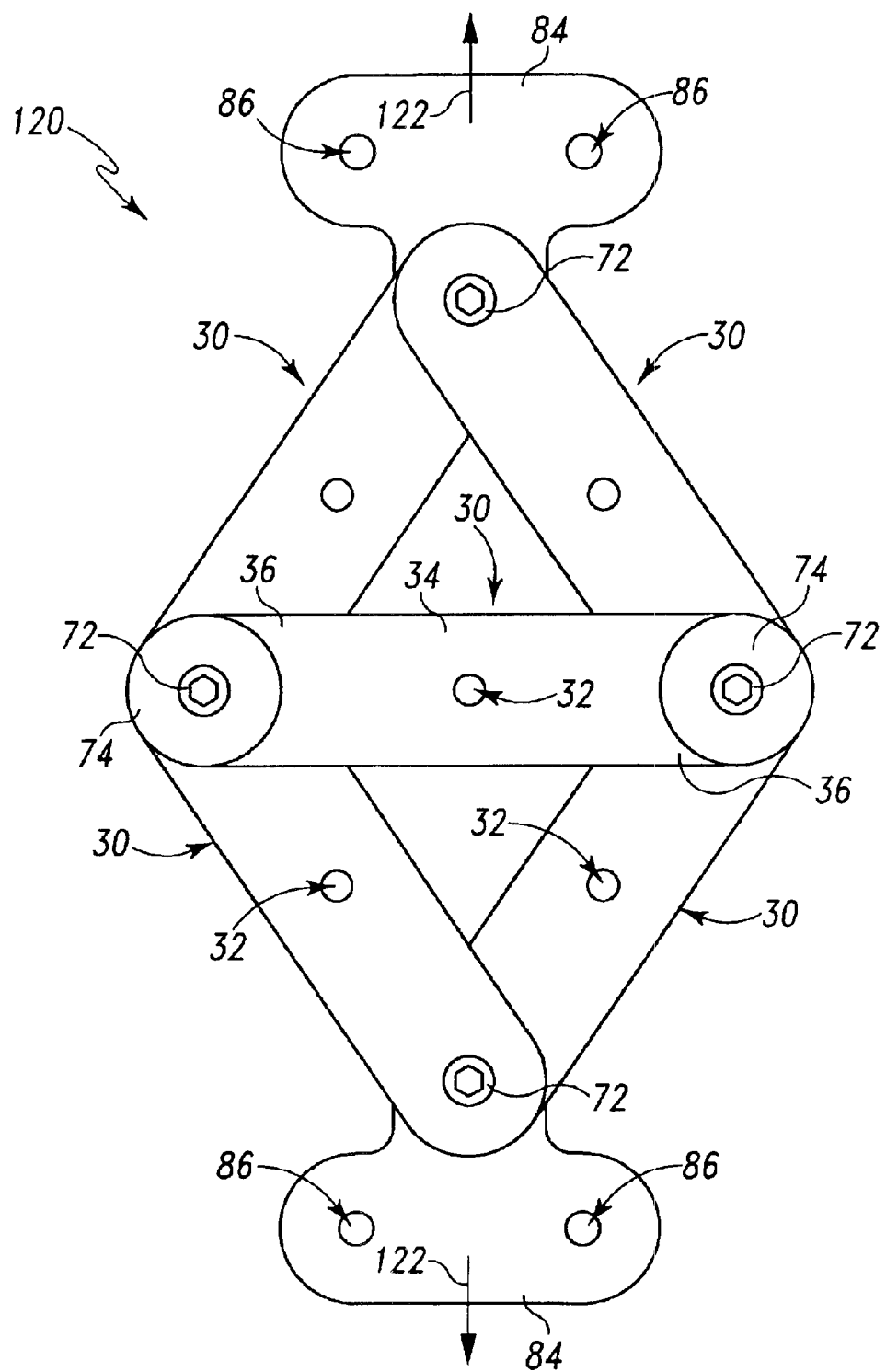
FIG. 9 is a front elevation view of a first alternative truss assembly constructed from the components of the kit of FIG. 4.

As mentioned above, kit 60 may be used to create various types of truss assemblies. A truss assembly 120, shown in FIG. 9, is another example of a truss assembly made from components of kit 60. Assembly 120 has five links 30 and two plates 84. One of links 30 is oriented horizontally, two of links 30 angle upwardly from end regions 36 of the horizontally extending link 30, and two of links 30 angle downwardly from end regions 36 of the horizontally extending link 30. The upper ends of the two upwardly angling links 30 are coupled together to form an upper connection of assembly 120 and the lower ends of the two downwardly angling links 30 are coupled together to form a lower connection of assembly 120. Illustratively, washers 74 are provided at the connections between the horizontally extending link 30 and the angling links 30, but washers 74 are omitted at the upper and lower connections.

One lobe of one of plates 84 is coupled to the upper connection of assembly 120 and one lobe of the other of plates 84 is coupled to the lower connection of assembly 120. Loads may be applied to the other lobes of plates 84, such as, for example, in the directions of vertical arrows 122 and the resulting stresses may be visualized using a polariscope. Plates 84 may be sized and configured for connection to mating clevises that are included in automated load applicators or that are coupled to weights, pulleys, levers, or any other mechanical load transmission member.

Figure 10:
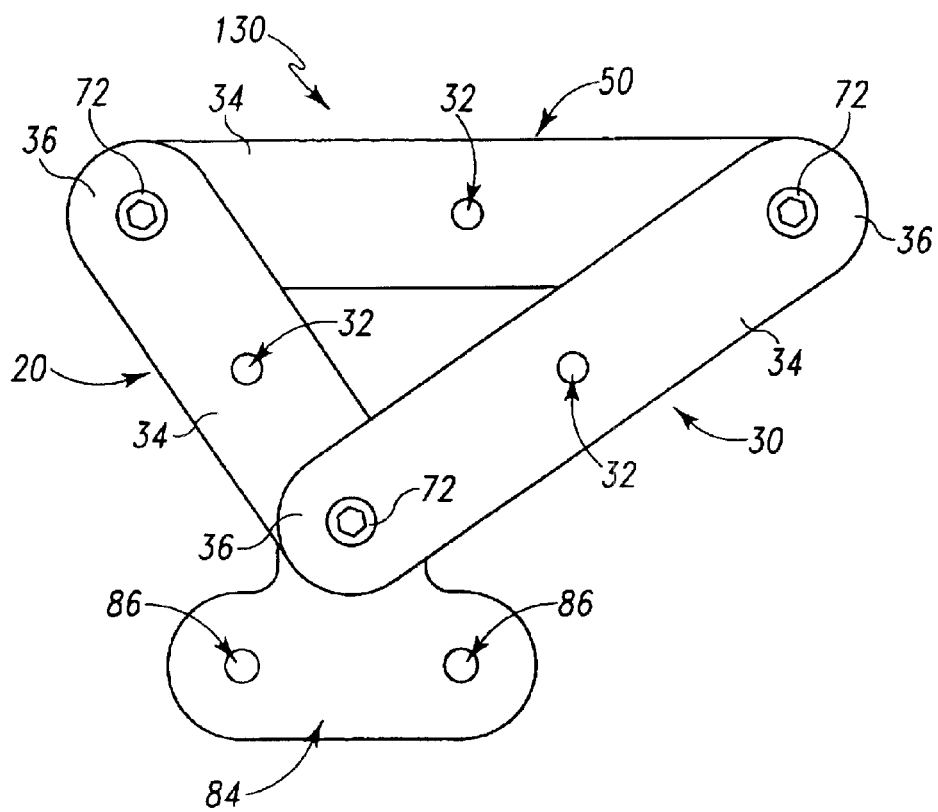
FIG. 10 is a front elevation view of a second alternative truss assembly constructed from the components of the kit of FIG. 4.

A truss assembly 130, shown in FIG. 10, is yet another example of a truss assembly that may be constructed from the components included in kit 60. Assembly 130 has one each of links 20, 30, 50 and one plate 84. Links 20, 30, 50 are coupled together to form a simple 3-4-5 right triangle. Illustratively, links 20, 30, 50 of assembly 130 are coupled together with nuts 76 and bolts 72 without the use of washers 74. Links 20, 30 are coupled to plate 84 in a lower corner of assembly 130.

Assemblies 100, 110, 120, 130 are just a few examples of the truss assembly configurations that are possible with the components included in kit 60 and are in no way intended to limit the scope of this disclosure. It will be appreciated that stress evaluation kits in accordance with this disclosure include photoelastic elements having stress concentrations formed therein, and such kits may also include photoelastic elements without stress concentrations, the devices for applying loads to the photoelastic elements or assemblies formed from the elements, one or more polariscopes that are operable to view the stresses created in the photoelastic elements due to the applied loads, and one or more software programs to evaluate computer-modeled elements similar in size and shape to the photoelastic elements. Additional examples of elements or links that may be included in kits according to this disclosure are shown in FIGS. 11, 14–17, and 20. However, elements or links of any suitable shape or size are within the scope of this disclosure.

Figure 11:
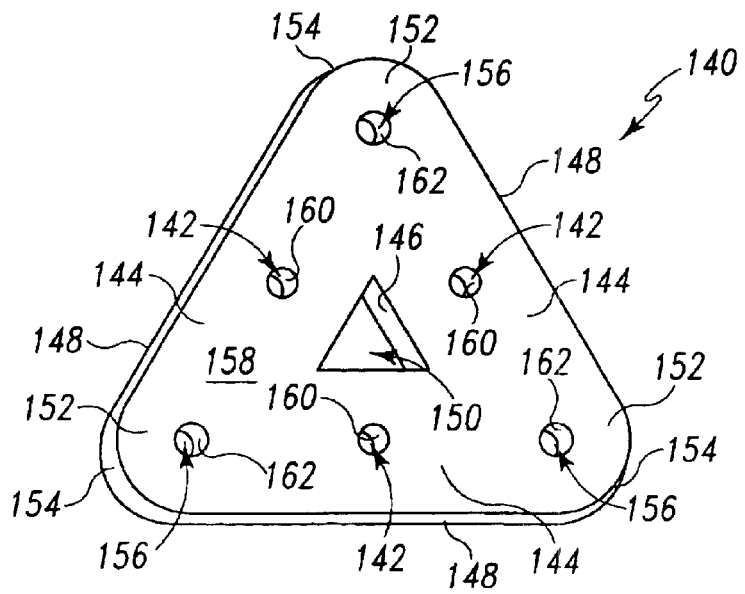
FIG. 11 is a front elevation view of a first alternative photoelastic element that is triangular in shape and that has stress concentrations formed in the central regions of each of the straight segments of the triangle.

Referring now to FIG. 11, an alternative photoelastic element or link 140 is triangular in shape and has stress concentrations 142 formed in central regions 144 of each of the straight segments that define the triangular shape of element 140. Central regions 144 have inner straight edges 146 and outer straight edges 148. Edges 146 cooperate to form a triangular aperture or stress concentration 150 in element 140. Element 140 has corner regions 152, each of which has rounded end edges 154 and each of which is formed to include an aperture 156. In addition, link 140 has a pair of spaced-apart, planar faces 158 that are perpendicular to edges 146, 148. Illustrative stress concentrations 142 of element 140 are round holes defined by respective cylindrical edges 160 that extend between faces 158. Edges 146 also extend between faces 158 to define the triangular stress concentration 150 in element 140. Illustrative apertures 156 are each defined by respective cylindrical edges 162 that extend between faces 42.

Stress concentrations 142 are located midway between respective pairs of apertures 156 and midway between respective straight edges 146, 148. Apertures 156 each have centers which coincide with respective centers of circles that are defined, in part, by respective rounded end edges 154. Axes (not shown) defined by cylindrical edges 160 are parallel with axes (not shown) defined by cylindrical edges 162. In addition, the axes defined by cylindrical edges 160, 162 are perpendicular to faces 158. In alternative embodiments, stress concentrations or holes are formed in element 140 at an angle that is not perpendicular to faces 158. In some embodiments, the thickness of link 140, which is defined as the perpendicular distance between faces 158, is substantially the same as the thickness of links 20, 30, 50 and apertures 156 are sized to receive threaded portions of bolts 72 therein.

Figure 12:
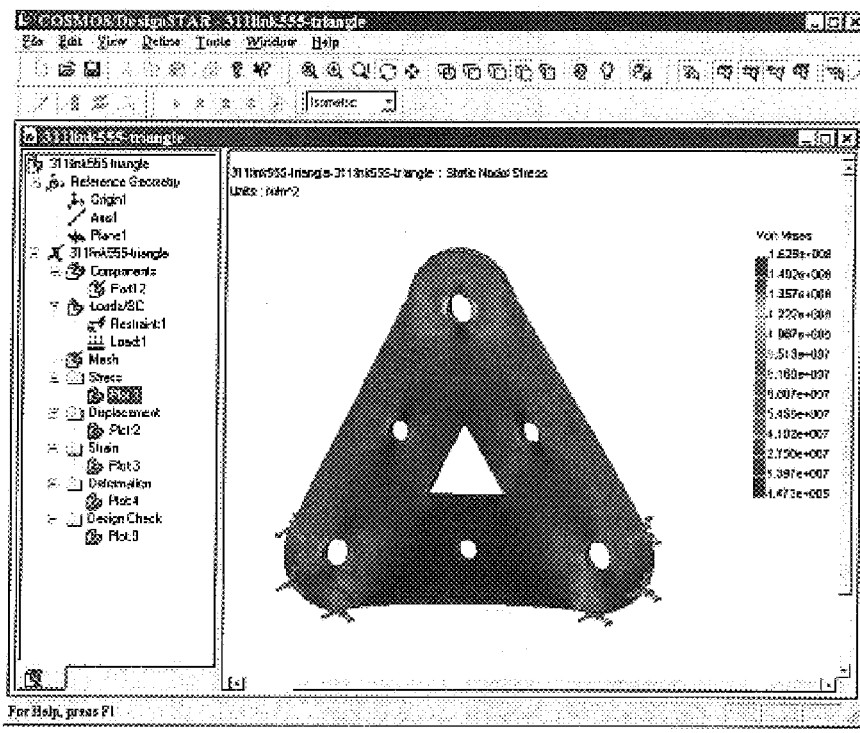
FIG. 12 is a color image showing a computer-modeled element, similar to the element of FIG. 11, under a load condition and showing a plot of static nodal stress created in the computer-modeled element.
Figure 13:
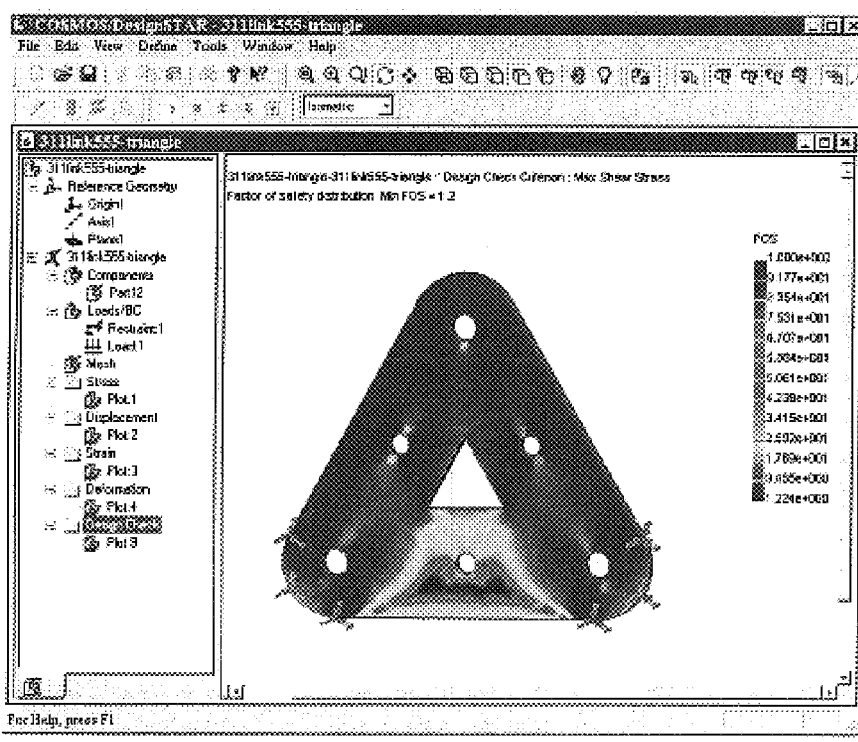
FIG. 13 is a color image of the computer-modeled element of FIG. 12 showing a plot of a factor of safety distribution under maximum shear stress in the computer-modeled element.

Link 140 may be modeled using COSMOS Design-STAR™ FEA software and may be placed, theoretically, under various types of loading conditions in order to produce color representations of predicted static nodal stresses as shown in FIG. 12 or to produce color representations of predicted factor of safety distribution under maximum shear stress conditions as shown in FIG. 13. Link 140 may be placed under load conditions substantially similar to those modeled in the FEA software and viewed with a polariscope to compare actual stress formation with predicted stress formation or with other computer-modeled parameters, such as the factor of safety distribution.

Figure 14:
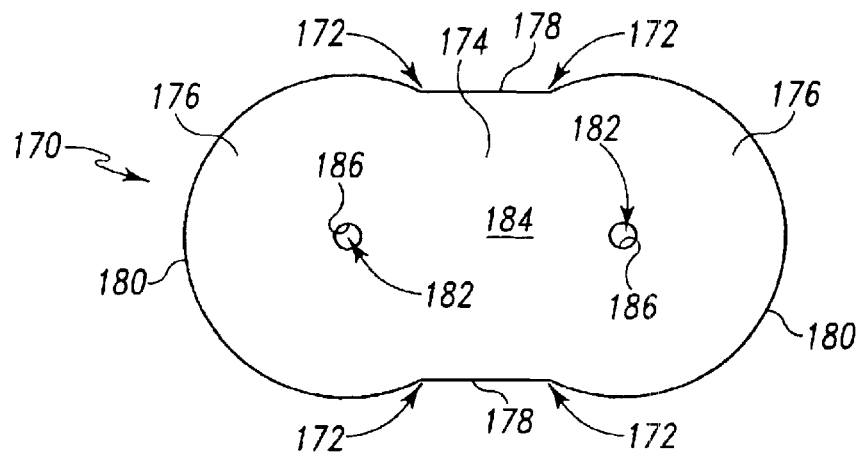
FIG. 14 is a front elevation view of a second alternative photoelastic link.

Referring now to FIG. 14, another alternative photoelastic element or link 170 has stress concentrations 172 formed between a central region 174 and end regions 176 of element 170. Central region 174 has straight side edges 178 and each end regions 176 has rounded end edges 180. The junctions between edges 178, 180 provide stress concentrations 172 in link 170. A fillet or small radius may be provided at each junction between edges 178, 180. End regions 176 are each formed to include an aperture 182. In addition, link 170 has a pair of spaced-apart, planar faces 184 that are perpendicular to side edges 178. Apertures 182 are each defined by respective cylindrical edges 186 that extend between faces 184. Apertures 182 each have centers which coincide with respective centers of circles that are defined, in part, by respective rounded end edges 180. Illustratively, end edges 180 form about 240 degrees of a circle from one associated stress concentration 172 to the other. As was the case with links 20, 30, 50, 140, element 170 may have loads applied thereto and be viewed with a polariscope. Link 170 may also be modeled and analyzed using FEA software.

Figure 15:
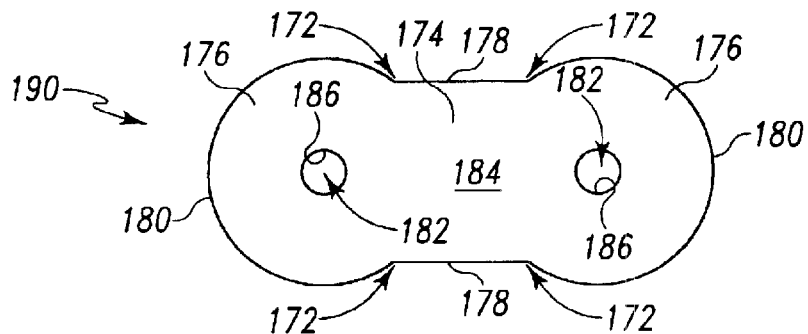
FIG. 15 is a front elevation view of a third alternative photoelastic link.

A further alternative photoelastic link or element 190, shown in FIG. 15, has a geometric shape similar to that of link 170. Therefore, like references numerals are used to denote portions of link 190 that correspond to like portions of link 170. One difference between link 190 and link 170 is that the width of central region 174 of link 190, which is defined as the perpendicular distance between edges 178, is smaller than the width of central region 174 of link 170. However, the length of each edge 178 between respective stress concentrations 172 of link 190 is substantially the same as the length of each edge 178 between stress concentrations 172 of link 170. To achieve similar lengths of edges 178 in links 170, 190, the radius of each end edge 180 of link 190 is smaller than the radius of each end edge 180 of link 170. End edges 180 of link 190 form about 270 degrees of a circle from one associated stress concentration to the other. Link 190 may be placed under similar loading conditions as link 170 and the stresses formed in element 190 may be viewed with a polariscope and compared to the stresses formed in link 170 to gain an understanding of how the differences in geometries between links 170, 190 affect the shape and magnitude of stress formation in these links. As was the case with link 170, link 190 may be computer modeled and analyzed in a desired manner.

Yet another illustrative photoelastic element or link 200 has enlarged end regions 210 and a narrow central region 212 that extends between end regions 210. Central region 212 has straight side edges 214. Each end region 210 has a straight end edge 216 and a pair of straight side edges 218 that are perpendicular to end edges 216 and that are parallel with side edges 214. Link 200 has a set of stress concentrations 220 that are provided by concave edges 222 which interconnect edges 214 with edges 218. End regions 210 are each formed to include an aperture 224. In addition, link 200 has a pair of spaced-apart, planar faces 226 that are perpendicular to edges 214, 216, 218. Apertures 224 are each defined by respective cylindrical edges 228 that extend between faces 226. As was the case with links 20, 30, 50, 140, 170, 190, element 200 may have loads applied thereto and be viewed with a polariscope. Element 200 may also be modeled and analyzed using FEA software.

Figures 16, 17:
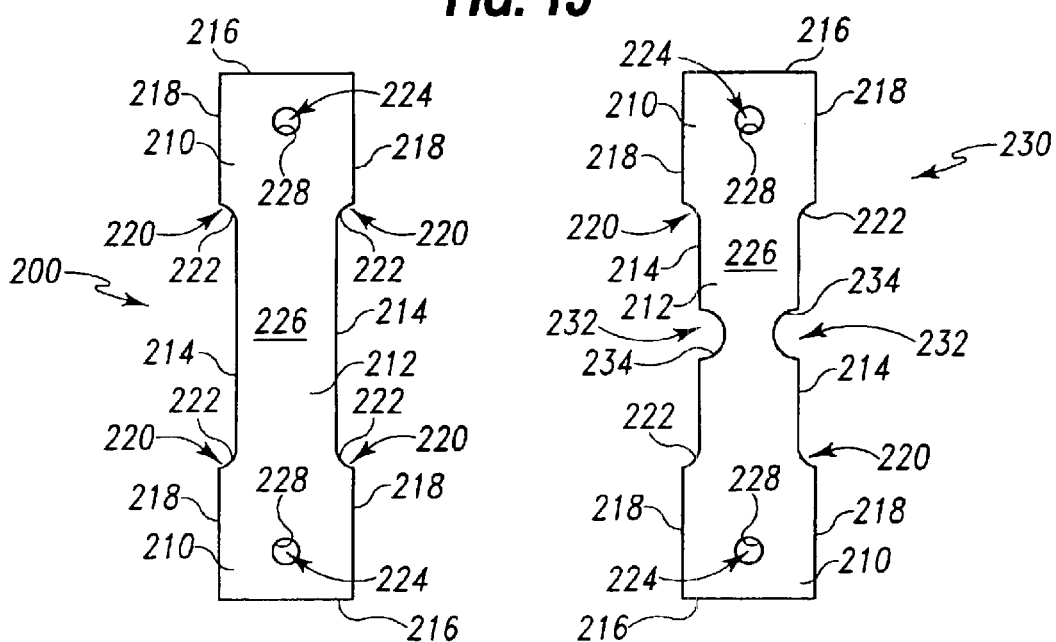
FIG. 16 is a front elevation view of a fourth alternative photoelastic link.
FIG. 17 is a front elevation view of a fifth alternative photoelastic link.

A further alternative photoelastic link or element 230, shown in FIG. 17, has a geometric shape similar to that of link 200. Therefore, like references numerals are used to denote portions of link 230 that correspond to like portions of link 200. The main difference between link 230 and link 200 is that link 230 has a pair of notches 232 formed in each side edge 214 of central region 212. Notches 232 provide an additional set of stress concentrations in link 230. Notches 232 are defined by concave, semi-circular edges 234. Link 230 may be placed under similar loading conditions as link 200 and the stresses formed in link 230 may be viewed with a polariscope and compared to the stresses formed in link 200 to gain an understanding of how the stress distribution in links 200, 230 is affected by the presence or absence of notches 232. As was the case with link 200, link 230 may be computer modeled and analyzed in a desired manner.

In addition to studying and comparing the effects of link geometry and/or stress concentration geometry on stress formation, this disclosure also contemplates studying and comparing the effects of manufacturing processes and techniques on stress formation. The links disclosed herein may be manufactured by a variety of processes including, for example, injection molding, stereolithography, casting, milling, cutting, and drilling, as well as combinations of these. Factors associated with each manufacturing process and technique may have an effect on stress formation in the resultant parts. The discussion below pertains to factors associated with plastic molding processes. However, this disclosure contemplates analyzing any desired manufacturing process parameter or factor to determine the effect on stress concentrations occurring in the resultant parts.

Characteristics inherent in molding processes that have an effect on stress formation in the resultant parts include, for example, temperature variations in a mold cavity during the molding process, pressure drops due to viscosity variations of polymer flow front in the mold cavity, and knit lines formed when slightly cooled plastic flows together from multiple directions in a mold cavity. High stresses often are produced along knit lines in molded parts and therefore, knit lines are considered to be stress concentrations in accordance with this disclosure. Furthermore, after a molded part cools, there are residual stresses in the molded part due to these various molding characteristics. One of the parameters selectable by designers of injection molding dies is the location in the dies of the gates through which molten plastic material is injected into mold cavities of the dies. The location of the gates through which material is injected into a mold cavity affects the above-mentioned molding characteristics. Designers sometimes use software, such as Mold-FLOW ADVISOR™ software, to determine gate locations.

Figure 18:
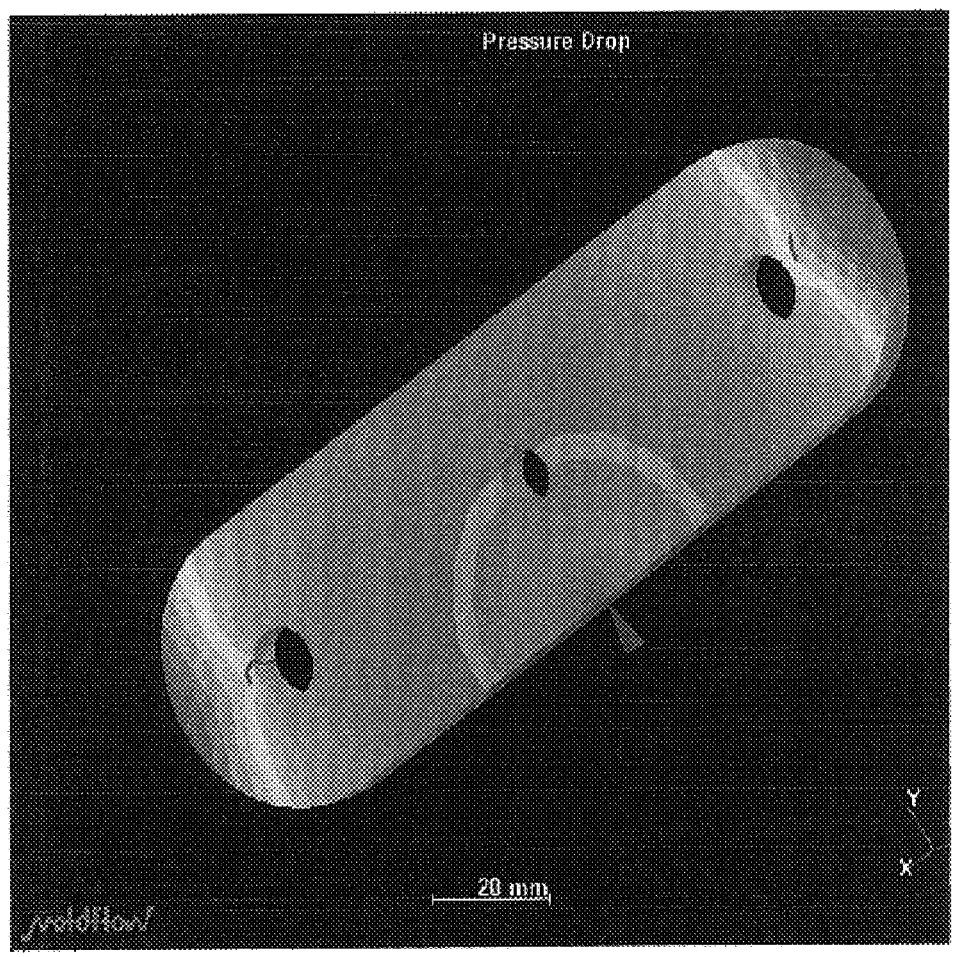
FIG. 18 is a color image of a mold flow analysis of a computer-modeled link, similar to the link of FIG. 1, when injection molded through a single gate.
Figure 19:
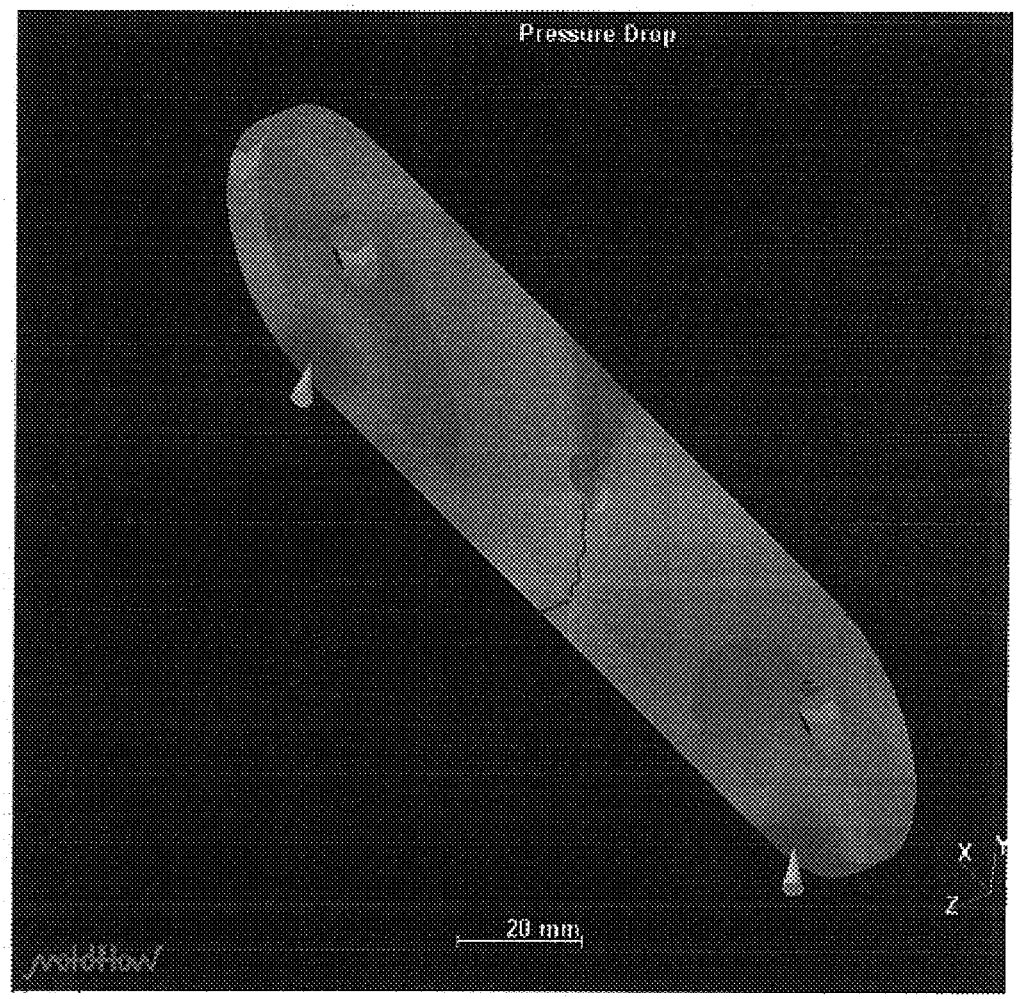
FIG. 19 is a color image of a mold flow analysis of a computer-modeled link, similar to the link of FIG. 1, when injection molded through a pair of gates.

Referring now to FIG. 18, the pressure drop in a computer-modeled mold cavity used to fabricate a link, which has the overall geometry of link 30 of FIG. 1, is shown in color. In FIG. 18, there is a single injection molding gate which is indicated by the red cone located along the side edge beneath the stress concentration or hole in the central region of the computer-modeled link. Referring now to FIG. 19, the pressure drop in a similar computer-modeled mold cavity is shown in color, but the mold cavity of FIG. 19 has two gates which are indicated by the yellow cones, each of which is located along the side edge beneath respective apertures formed in end regions of the link. The red lines extending between the side edges and the hole in the central region of the link of FIG. 19 indicates that a knit line is predicted to occur by the software along the red lines. Thus, one may conclude that the location of the single gate, shown in FIG. 18, is preferable to the location of the pair of gates, shown in FIG. 19.

Photoelastic links 30 may be manufactured using molds having gates located similarly to the gate locations modeled in FIGS. 18 and 19. Similar loads may then be applied to the links 30 and the stresses occurring in the links may be viewed with a polariscope to confirm that high stresses do, in fact, occur along the predicted knit line in the link 30 that is fabricated in the die having two gates. It is within the scope of this disclosure for photoelastic parts to be made such that one or more knit lines are the only stress concentration(s) in the parts.

Figure 20:
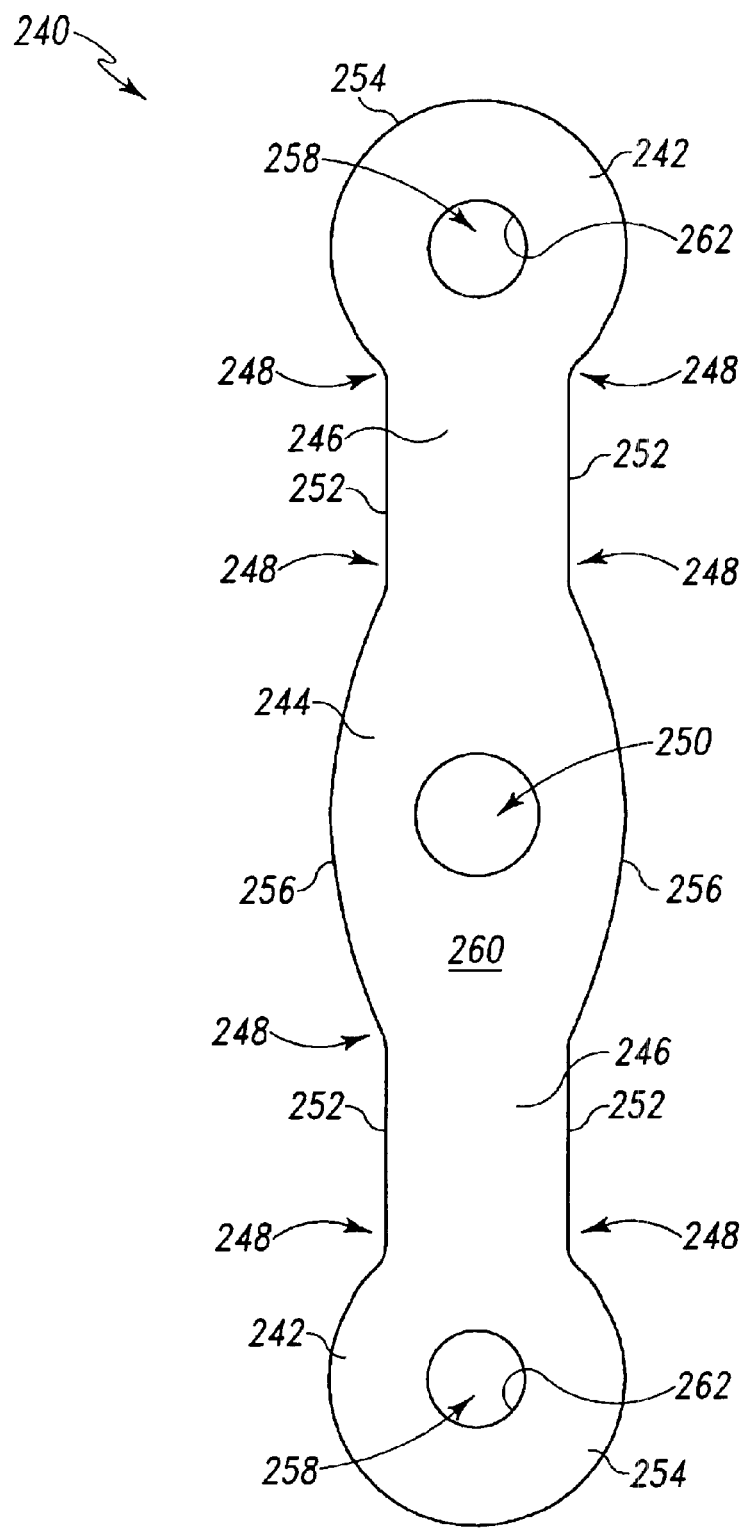
FIG. 20 is a front elevation view of a sixth alternative photoelastic link.

Referring now to FIG. 20, another alternative photoelastic link 240 has rounded end regions 242, a bulged central region 244, and intermediate regions 246 interconnecting the end and central regions 242, 244. Stress concentrations 248 are defined at the junctions between regions 246 and each of regions 242, 244. In addition, a stress concentration or hole 250 is formed in region 246. Intermediate regions 246 each have a pair of straight side edges 252, end regions 242 each have rounded end edges 254, and central region 244 has convex side edges 256. A fillet or small radius may be provided at each junction between edges 252, 254, 256. End regions 242 are each formed to include an aperture 258. In addition, link 240 has a pair of spaced-apart, planar faces 260 that are perpendicular to side edges 252. Apertures 258 are each defined by respective cylindrical edges 262 that extend between faces 260. Apertures 258 each have centers which coincide with respective centers of circles that are defined, in part, by respective rounded end edges 254. Illustratively, end edges 180 form about 270 degrees of a circle from one associated stress concentration 248 to the other.

Figure 21:
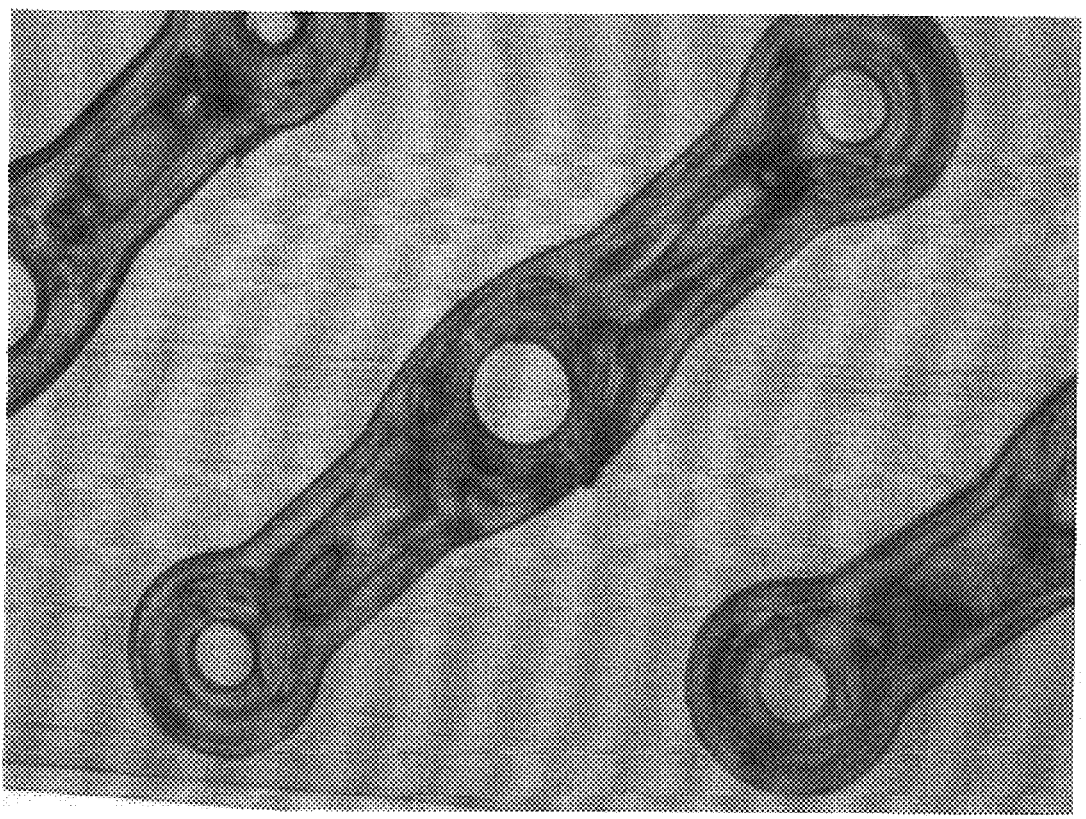
FIG. 21 is a color image of the sixth alternative link when viewed with a polariscope showing residual stresses that are present in the fifth alternative link.
Figure 22:
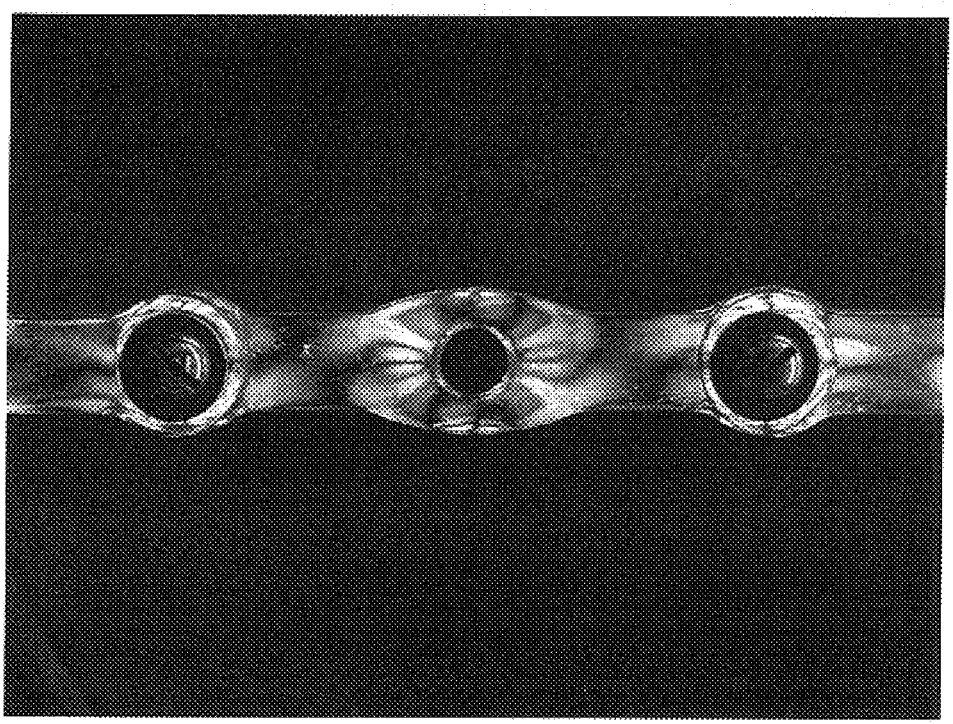
FIG. 22 is a color image of the sixth alternative link when viewed with a polariscope showing the stresses created when the fifth alternative link is loaded in tension.

As mentioned previously, residual stresses may be present in molded parts as a result of temperature and/or pressure variations inherent in the molding process. FIG. 21 is a color polariscope image showing the residual stresses that are present in link 240 and in portions of links of similar shape that are located on either side of link 240. As is apparent from FIG. 21, residual stresses are present in link 240 even though no load is being applied to link 240. As was the case with the other photoelastic elements disclosed herein, element 240 may have loads applied thereto and be viewed with a polariscope as shown in FIG. 22. Link 240 is loaded in tension in FIG. 22. Link 240 may also be modeled and analyzed using FEA software. By viewing link 240 with a polariscope in unloaded and loaded conditions, one may gain an understanding of the effect of residual stresses on stress formation when loads are applied.

Based on the preceding discussion, it will be appreciated that photoelastic elements of practically any size and shape and that stress concentrations of all sorts are contemplated by this disclosure. Although the various photoelastic elements disclosed herein each have planar faces, it is within the scope of this disclosure for photoelastic elements to be cylindrical, toroidal, tubular, conical, or any other three-dimensional shape. Stress concentrations contemplated herein include holes in parts and such holes may be round, oval, triangular, square, rectangular, pentagonal, hexagonal, octagonal, star-shaped, and so on. Stress concentrations contemplated herein also include junctions between different regions of a part. Furthermore stress concentrations contemplated herein include notches in parts and such notches may be of any shape, such as, for example, V-shaped, round, square, oval, etc. Stress concentrations contemplated herein also include slots, grooves, channels, and tunnels of any desired size and shape. In addition, stress concentrations include knit lines in parts fabricated by injection molding processes. Stress concentrations may be formed closer to one end of an element than another end of the element. A single element may have either a single stress concentration or multiple stress concentrations.

Also based on the preceding discussion, it will be appreciated that visual comparisons of stress formation between actual photoelastic parts and computer-modeled parts are contemplated by this disclosure, as are comparisons between stress formation in actual photoelastic parts and other computer-modeled parameters. Visual comparisons with a polariscope of stress formation between photoelastic parts of one geometry and photoelastic parts of another geometry are contemplated herein. Visual comparisons with a polariscope of stress formation between a photoelastic part having one or more stress concentrations of one configuration (i.e. type, size, shape, location, etc.) and another photoelastic part having one or more stress concentrations of another configuration are also contemplated herein. Visual comparisons with a polariscope of photoelastic parts made by one manufacturing process or technique and photoelastic parts made by another manufacturing process or technique are also contemplated herein.

In an academic setting, such as a university, one class of students may design truss elements or links that are of a particular size and shape and that have stress concentrations formed therein and another class may determine the appropriate manufacturing methods and techniques for making the designed elements. During such a cooperative effort, a wide variety of software packages may be used to supplement the visual comparisons that the students make to determine stress formation in the parts that are designed and fabricated. Also in an academic setting, kits having various photoelastic truss elements may be provided to students for building truss assemblies of various configurations for analysis with a polariscope. Such kits may include elements that have substantially the same geometry but that are made by different manufacturing processes. Virtual experiments that are accessible to students for distance learning may be implemented by taking fine granularity digital images of various elements and/or truss assemblies that are situated between polarized filter elements of a polariscope, under various load conditions, and making the images available via the world wide web (i.e., the Internet). Images of computer-modeled links and assemblies may also be made available on the Internet. FEA software and other types of software may also be made available on the Internet so that students may use the software to perform their own, additional analysis of the elements and truss assemblies.

Figure 23:
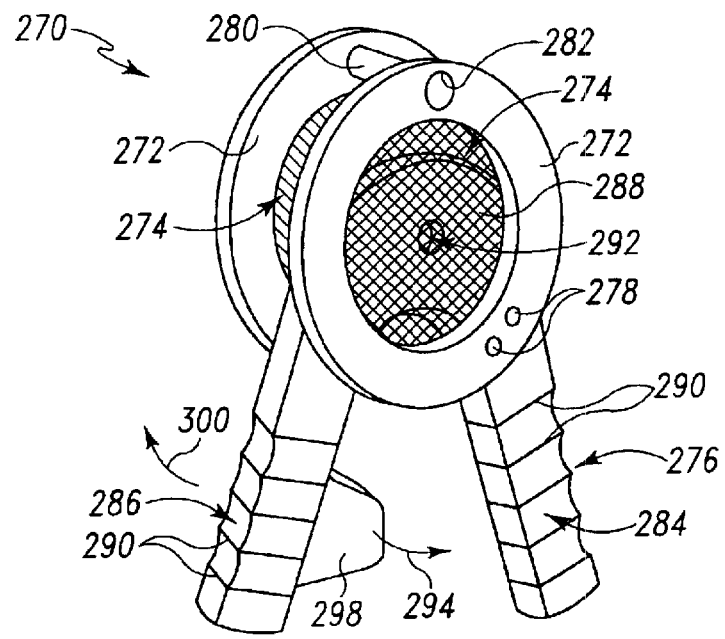
FIG. 23 is a perspective view of a stress-visualization toy showing a pair of spaced-apart frames, polarization filters coupled to the frames, and a handle having a first portion coupled to the frames, a second portion that is squeezable toward the first portion, and a flexible portion interconnecting the first and second portions.
Figure 24:
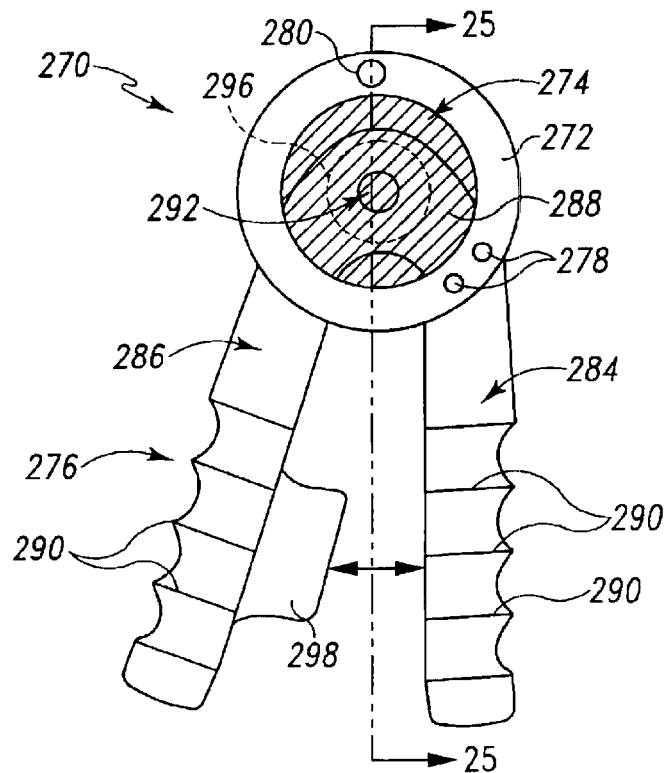
FIG. 24 is a side elevation view of the toy of FIG. 23 showing the second portion of the handle squeezed partially toward the first portion of the handle and showing, diagrammatically via a dotted circle, a set of isochromatic bands or fringes being viewable in a region of the flexible portion adjacent a stress concentration formed in the flexible portion.
Figure 25:
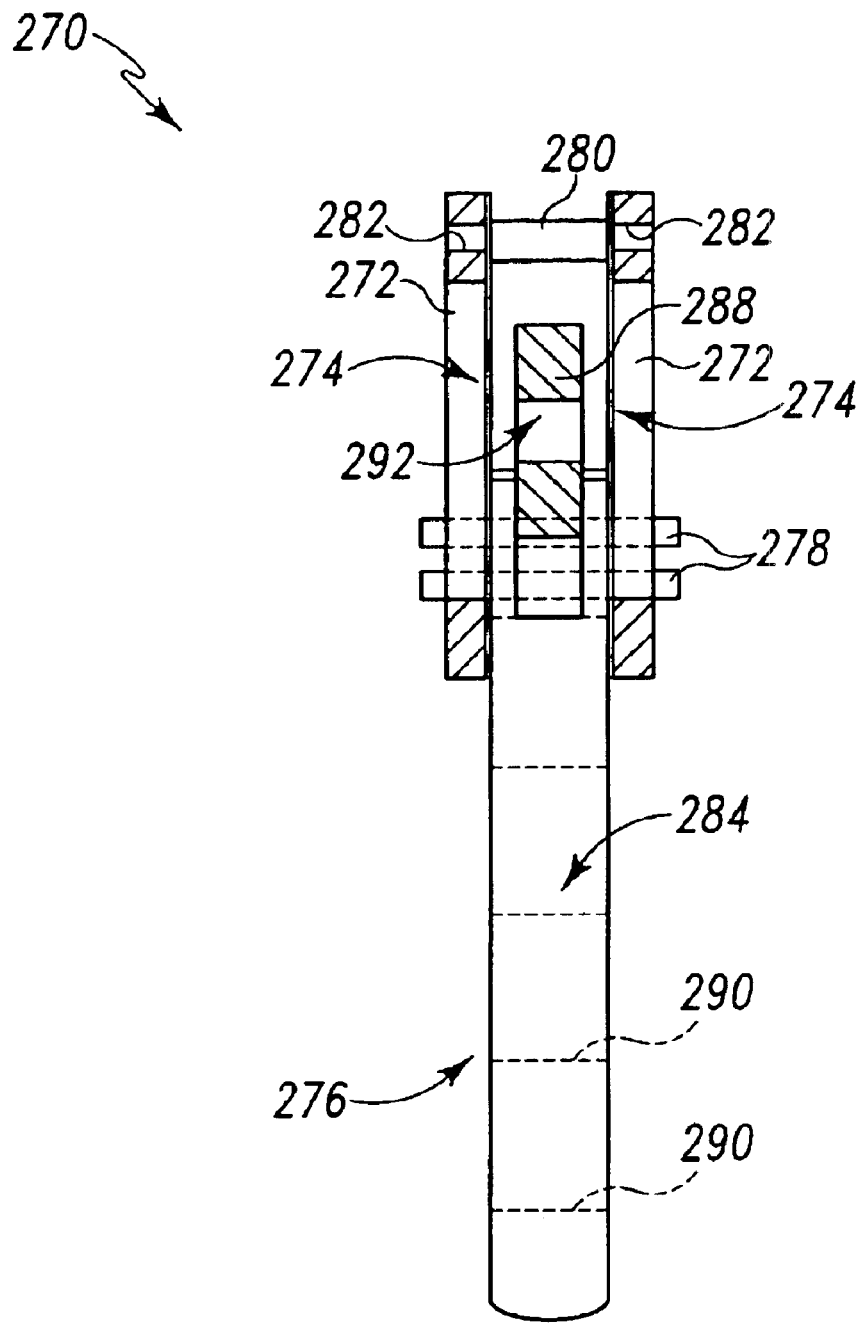
FIG. 25 is a sectional view, taken along line 25—25 of FIG. 24.

Referring now to FIGS. 23–25, a stress-visualization apparatus or toy 270 has a pair of spaced-apart frames 272, a polarization filter 274 coupled to each frame 272, and a handle 276 coupled to frames 272 by suitable couplers, such as pins 278. Illustrative frames 272 are round, annular plates that are held in spaced relation by a pin 280 that extends between the upper portions of frames 272. Opposite ends of pin 280 are received in pin-receiving apertures 282 formed in frames 272. Polarization filters 274 are arranged such that their lines of polarization are orthogonal. Handle has a first portion 284 coupled to frames 272 by pins 278, a second portion 286 that is squeezable toward first portion 284, and a flexible portion 288 interconnecting first and second portions 284, 286. Portions 284, 286 each have a plurality of ridges 290 to enhance the ability of a user to grip the handle 276.

Flexible portion 288 is situated in the space between frames 272 and has a stress concentration, such as illustrative hole 292 formed therein, as shown in FIGS. 23–25. Although illustrative stress concentration 292 is depicted as a circular hole extending through flexible portion 288, it is within the scope of this disclosure for any of the stress concentrations mentioned throughout this disclosure to be included in flexible portion 288 in lieu of the illustrative circular hole.

Handle 276 is configured so that squeezing second portion 286 toward first portion 284 in the direction of arrow 294, shown in FIG. 23, flexes flexible portion 288 to induce stress therein. When stress is induced in flexible portion 288, a pronounced set of isochromatic bands or fringes of various colors is observable by looking at flexible portion 288 through the pair of filters 274. The isochromatic bands or fringes are illustrated diagrammatically in FIG. 24 as a dotted circle 296 around hole 292. Thus, toy 270 operates as a polariscope that permits viewing of the stresses induced in portion 288. A stop 298 is appended to portion 286 and engages portion 284 to limit the amount that handle 276 is able to be squeezed in direction 294. Thus, engagement between stop 298 and portion 284 prevents portion 288 from being overflexed. When portion 286 is released, portion 288 unflexes causing portion 286 to move away from portion 284 in the direction of arrow 300, shown in FIG. 23.

In some alternative embodiments of toy 270, flexible portion 288 is detachable from portions 284, 286, and other types of flexible portions having other types of stress concentrations or having other properties different than portion 288, such as being a different thickness, different material, etc., can be attached to portions 284, 286. Toy 270 may include other types of devices capable of applying an axial force only, a twisting torque only, and/or a combination of bending, axial, and twisting to a photoelastic element that is situated between frames 272 in lieu of squeezable handle portions 284, 286. Such alternative devices may include, twistable grip handles, levers, pull rings, and the like.

Although the invention has been described in detail with reference to certain illustrative apparatus and methods, variations and modifications exist with the scope and spirit of this disclosure as described and defined in the following claims.

What is claimed is:

1. A method of enhancing the visualization of stress, the method comprising
  producing a part made of a photoelastic material or coated with a photoelastic material and a reflective coating, the part having a stress concentration feature formed therein, the stress concentration feature extending between oppositely facing external surfaces of the part,
  applying a load to the photoelastic part to create stresses in the photoelastic part, and
  using a polariscope to view isochromatic fringes that indicate the stresses in the photoelastic part resulting from the load applied to the photoelastic part.

2. The method of claim 1, further comprising using finite element analysis (FEA) software to predict stresses in a computer-modeled part having substantially the same geometry as the photoelastic part and comparing visually the stresses predicted by the FEA software with the stresses viewed using the polariscope.

3. The method of claim 1, wherein the stress concentration in the photoelastic part comprises a hole through the photoelastic part.

4. The method of claim 3, wherein the photoelastic part has end regions and the hole is situated midway between end regions.

5. The method of claim 1, wherein the stress concentration in the photoelastic part comprises at least one notch in the photoelastic part.

6. The method of claim 5, wherein the photoelastic part has side edges and the at least one notch comprises a pair of notches formed in the side edges.

7. The method of claim 1, wherein the stress concentration in the photoelastic part comprises at least one knit line formed in the photoelastic part by a molding process.

8. A method of visualizing stress in an assembly made of multiple elements, the method comprising producing multiple elements, each element being made of a photoelastic material, and at least some of the elements having at least one stress concentration formed therein to extend between oppositely facing external surfaces of the respective element, coupling the elements together to form the assembly, applying a load to the assembly, and using a polariscope to view isochromatic fringes produced as a result of applying the load to the model of the assembly.

9. The method of claim 8, further comprising using finite element analysis (FEA) software to predict stresses in a computer-modeled assembly having substantially the same configuration as the assembly and comparing visually the stresses predicted by the FEA software with the stresses viewed using the polariscope.

10. The method of claim 8, wherein the at least one stress concentration formed in at least some of the elements comprises a hole through the respective elements.

11. The method of claim 8, wherein the at least one stress concentration formed in at least some of the elements comprises a notch formed in the respective elements.

12. The method of claim 8, wherein the at least one stress concentration formed in at least some of the elements comprises a knit line formed in the respective elements by a molding process.

13. A method of evaluating the effects of location of gates sites in injection molded parts on stress formation occurring in the parts when loads are applied to the parts, the method comprising injection molding multiple parts from a photoelastic material, each of the multiple parts having a substantially identical geometry to each of the other multiple parts, the multiple parts being molded such that a number of injection molding gate sites or location of at least one of the injection molding gate sites vary from part to part for at least some of the multiple parts, applying substantially identical loads to each of the parts after the injection molding step, and using a polariscope to view the stress formation in each of the parts while the load is applied to each of the parts.

14. The method of claim 13, further comprising using software to model temperature drop in a computer-modeled mold cavity having substantially the same geometry as that used for injection molding the multiple parts and comparing visually the temperature drop modeled by the software with the stresses viewed using the polariscope.

15. The method of claim 13, further comprising using software to predict knit line location in computer-modeled parts each having substantially the same geometry as the multiple parts and comparing visually the knit line location predicted by the software with the stresses viewed using the polariscope.

16. A kit for constructing a plurality of truss assemblies and for visualizing stress occurring in each of the truss assemblies as a result of an applied load, the kit comprising a plurality of links, each link being made of a photoelastic material and having a stress concentration formed therein, and a plurality of couplers configured to join two or more of the plurality of links together to form at least a first truss assembly of the plurality of truss assemblies, and a polariscope for viewing isochromatic bands which occur in the first truss assembly as a result of the first truss assembly being subjected to the applied load and which are indicative of the stress levels occurring in the first truss assembly.

17. The kit of claim 16, wherein at least a first link of the plurality links has a length of three length units, at least a second link of the plurality of links has a length of four length units, and at least a third link of the plurality of links has a length of five length units.

18. The kit of claim 17, wherein the length units are inches.

19. The kit of claim 17, wherein each link of the plurality of links has a pair of spaced-apart apertures, each aperture being configured for receipt of a portion of one of the plurality of link couplers, and the length of the plurality of links being defined between centers of the respective spaced-apart apertures.

20. The kit of claim 16, further comprising at least one additional link that is free of any stress concentrations like the stress concentrations of the plurality of links.

21. The kit of claim 16, further comprising a load applicator configured to apply loads to the truss assemblies formed by the plurality of links.

22. The kit of claim 16, wherein the stress concentration in at least some of the links comprises a hole through the respective links.

23. The kit of claim 16, wherein the stress concentration in at least some of the links comprises a notch in the respective links.

24. The kit of claim 16, wherein the stress concentration in at least some of the links comprises an injection molding knit line in the respective links.

25. A kit for constructing a plurality of truss assemblies which are to be evaluated with a polariscope to visualize stress occurring in each of the truss assemblies as a result of an applied load, the kit comprising a plurality of links, each link being made of a photoelastic material and having a stress concentration formed therein to extend between oppositely facing external surfaces of the respective link, and a plurality of couplers configured to join two or more of the plurality of links together to form at least a first truss assembly of the plurality of truss assemblies.

26. The kit of claim 25, wherein at least a first link of the plurality links has a length of three length units, at least a second link of the plurality of links has a length of four length units, and at least a third link of the plurality of links has a length of five length units.

27. The kit of claim 26, wherein each link of the plurality of links has a pair of spaced-apart apertures, each aperture being configured for receipt of a portion of one of the plurality of link couplers, and the length of the plurality of links being defined between centers of the respective spaced-apart apertures.

28. The kit of claim 25, further comprising at least one additional link that is free of any stress concentrations like the stress concentrations of the plurality of links.

29. The kit of claim 25, further comprising a load applicator configured to apply loads to the truss assemblies formed by the plurality of links.

30. The kit of claim 25, wherein the stress concentration in at least some of the links comprises any one or more of a hole through the respective links, a notch in the respective links, or an injection molding knit line in the respective links.

* * * * *